(12) United States Patent
Liu et al.

(10) Patent No.: US 11,877,259 B2
(45) Date of Patent: Jan. 16, 2024

(54) PAGING METHOD, TERMINAL DEVICE, AND NETWORK DEVICE

(71) Applicant: HUAWEI TECHNOLOGIES CO., LTD., Guangdong (CN)

(72) Inventors: Jianqin Liu, Beijing (CN); Xu Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 399 days.

(21) Appl. No.: 17/244,566

(22) Filed: Apr. 29, 2021

(65) Prior Publication Data

US 2021/0250899 A1     Aug. 12, 2021

Related U.S. Application Data

(63) Continuation of application No. PCT/CN2019/111646, filed on Oct. 17, 2019.

(30) Foreign Application Priority Data

Nov. 2, 2018   (CN) .......................... 201811302859.2

(51) Int. Cl.
*H04W 68/00*      (2009.01)
*H04W 76/28*      (2018.01)

(52) U.S. Cl.
CPC ......... *H04W 68/005* (2013.01); *H04W 76/28* (2018.02)

(58) Field of Classification Search
None
See application file for complete search history.

(56) References Cited

U.S. PATENT DOCUMENTS

2010/0248752 A1* 9/2010 Yu .......................... H04W 72/23
                                                           455/458
2017/0135067 A1* 5/2017 Su .......................... H04W 76/28

FOREIGN PATENT DOCUMENTS

| CN | 102651908 A | 8/2012 |
|----|-------------|--------|
| CN | 102740422 A | 10/2012 |
| CN | 107534937 A | 1/2018 |
| CN | 108370556 A | 8/2018 |
| CN | 108702731 A | 10/2018 |
| EP | 3691374 A1 | 8/2020 |
| WO | 2017211682 A1 | 12/2017 |
| WO | 2020068290 A1 | 4/2020 |

OTHER PUBLICATIONS

LG Electronics Inc., "Paging enhancements in NR Unlicensed band," 3GPP TSG-RAN WG2#103bis, R2-1815339, Chengdu, China, Oct. 8-12, 2018, 3 pages.

(Continued)

*Primary Examiner* — Frantz Bataille
(74) *Attorney, Agent, or Firm* — Fish & Richardson P.C.

(57) ABSTRACT

A paging method to improve transmission efficiency of a paging message is provided. The method includes that a first terminal device determines, in a discontinuous reception periodicity, a first paging occasion of the first terminal device. When channel listening on the first paging occasion fails, the first terminal device receives a first paging message in a time window, where a start position of the time window is determined based on the first paging occasion, and the time window includes at least one paging occasion.

20 Claims, 6 Drawing Sheets

(56) References Cited

OTHER PUBLICATIONS

Huawei et al., "Further discussion on configured grant during RA procedure," 3GPP TSG-RAN WG2 Meeting#103bis, R2-1815300, Chengdu, China, Oct. 8-12, 2018, 3 pages.
Apple Inc., "Considerations on NR-U Paging," 3GPP TSG-RAN WG2 Meeting #103bis, R2-1814544, Chengdu, China, Oct. 8-12, 2018, 4 pages.
PCT International Search Report and Written Opinion in International Application No. PCT/CN2019/111646, dated Jan. 14, 2020, 17 pages.
Office Action in Chinese Application No. 201811302859.2, dated Oct. 29, 2020, 22 pages.
Office Action issued in Chinese Application No. 201811302859.2 dated Aug. 12, 2021, 5 pages.
Extended European Search Report issued in European Application No. 19880689.5 dated Nov. 5, 2021, 10 pages.

* cited by examiner

PAGING METHOD, TERMINAL DEVICE, AND NETWORK DEVICE

CROSS-REFERENCE TO RELATED APPLICATIONS

This application is a continuation of International Application No. PCT/CN2019/111646, filed on Oct. 17, 2019, which claims priority to Chinese Patent Application No. 201811302859.2, filed on Nov. 2, 2018. The disclosures of the aforementioned applications are hereby incorporated by reference in their entireties.

TECHNICAL FIELD

This application relates to the communications field, and in particular, to a paging method, a terminal device, and a network device.

BACKGROUND

In the 3rd generation partnership project (3GPP), for example, in a long term evolution (LTE) system, a network device may send paging messages to user equipment (UE) in idle mode and user equipment in connected mode. A paging process may be triggered by a core network or a base station (eNodeB). The paging message is used to: send a call request to the UE in idle mode, notify a system information update, or indicate the UE to receive information such as earthquake and tsunami warning information ((ETWS) and a commercial mobile alert service (CMAS).

After receiving the paging message from the core network, the eNodeB interprets content in the paging message, to obtain a tracking area identity (TAI) list of the UE, and performs, through an air interface, paging in a cell belonging to a tracking area in the list. A core network domain (CN Domain) in the paging message indicates that the paging message is not decoded by the eNodeB, but is transmitted to the UE for decoding. After receiving the paging message from the core network, the eNodeB aggregates paging messages of UEs having a same paging occasion (PO) into one paging message and sends the paging message to the related UEs through paging channels. The UE calculates the paging occasion based on a paging parameter received by using a system message and an international mobile subscriber identity (IMSI) of the UE, and receives the paging message at a corresponding time.

To reduce power consumption of the UE, the UE aperiodically receives the paging message in a discontinuous reception (DRX) mode. In a DRX periodicity, the UE wakes up only at a PO moment of a corresponding paging frame (PF), to receive the paging message. In a DRX periodicity, the terminal may receive control information only at a time position at which a PO appears, and then receive data based on scheduling information of a control channel. The UE may be in a sleep state at a time outside the DRX periodicity, to reduce power consumption.

In a conventional-technology implementation process, a terminal receives a paging message only at a PO moment in a DRX periodicity. However, in an unlicensed frequency band, listen before talk (LBT) needs to be performed before signal transmission, including paging message transmission. In other words, a base station can send a signal only when the LBT succeeds and resource preemption succeeds, but there is great uncertainty on a result of each time of resource preemption. In this way, in a conventional technology, for a paging occasion that is semi-statically configured or implicitly determined, because LBT fails, the paging message cannot be sent even at a previously determined PO moment. Consequently, a quantity of paging occasions on which the base station can actually perform sending is significantly reduced, and some important information carried in the paging message cannot be delivered to a user in time.

It can be learned from the foregoing analysis that, in the conventional technology, a quantity of paging occasions is reduced because the LBT fails. Consequently, transmission efficiency of the paging message is reduced.

SUMMARY

Embodiments of this application provide a paging method, a terminal device, and a network device, to improve transmission efficiency of a paging message.

To resolve the foregoing technical problem, the embodiments of this application provide the following technical solutions.

According to a first aspect, an embodiment of this application provides a paging method. The method includes: A first terminal device determines, in a discontinuous reception periodicity, a first paging occasion of the first terminal device; and when channel listening on the first paging occasion fails, the first terminal device receives a first paging message in a time window, where a start position of the time window is determined based on the first paging occasion, and the time window includes at least one paging occasion. In this embodiment of this application, the first terminal device may determine the first paging occasion that is in the discontinuous reception periodicity and that is used to send the first paging message. If a network device cannot actually send the paging message on the first paging occasion, the first paging occasion that cannot be actually used because the channel listening fails is transferred to a next paging occasion in the time window, and the first terminal device may receive the first paging message on another paging occasion in the time window based on the first paging occasion. Therefore, transmission efficiency of the paging message is improved.

In a possible implementation of the first aspect, each paging occasion included in the time window corresponds to at least one paging position, and different paging positions occupy different bandwidth areas. Each paging occasion corresponds to at least one paging position in frequency domain. For example, each paging occasion corresponds to at least two paging positions, and different paging positions occupy different bandwidth areas. One bandwidth area may be one bandwidth part, or one bandwidth area may be one subband. For example, the subband is a bandwidth of 20 MHz or a bandwidth of 40 MHz. For a plurality of paging positions corresponding to the first paging occasion, these paging positions occupy different bandwidth areas in frequency domain.

In a possible implementation of the first aspect, that the first terminal device receives a first paging message in a time window includes: If the time window further includes a second paging occasion, the first terminal device receives the first paging message on the second paging occasion. When the channel listening performed by the network device on the first paging occasion fails, the network device determines the start position of the time window based on the first paging occasion. The network device may send the first paging message to the first terminal device on the second paging occasion in the time window. Correspondingly, the first terminal device may determine the second paging occasion in the time window. In this case, the first terminal device may receive the first paging message on the second paging occasion. Therefore, a problem that the paging message cannot be transmitted because the channel listening on the first paging occasion fails is resolved.

In a possible implementation of the first aspect, that the first terminal device receives the first paging message on the second paging occasion includes: If the second paging occasion corresponds to at least two paging positions, the first terminal device receives the first paging message at a first paging position corresponding to the second paging occasion, where a second paging position corresponding to the second paging occasion is used by a second terminal device to receive a second paging message. The first terminal device receives the first paging message at the first paging position corresponding to the second paging occasion, and the second terminal device may receive the second paging message at the second paging position corresponding to the second paging occasion. This improves transmission efficiency of the first paging message.

In a possible implementation of the first aspect, the second paging position is a paging position corresponding to a bandwidth area with a smallest index or a paging position corresponding to a bandwidth area with a largest index. The second terminal device may determine, in a predefined manner, the second paging position corresponding to the second paging occasion. It may be directly defined that the paging position corresponding to the bandwidth area with the smallest index or the paging position corresponding to the bandwidth area with the largest index is the second paging position, where the smallest index means that an index of a bandwidth area is the smallest, the largest index means that an index of a bandwidth area is the largest, the bandwidth area herein refers to a bandwidth range occupied by signal transmission, and the bandwidth area may be a subband in frequency domain. One bandwidth area may be one bandwidth part, or one bandwidth area may be one subband.

In a possible implementation of the first aspect, before the first terminal device receives the first paging message at the first paging position corresponding to the second paging occasion, the method further includes: The first terminal device receives a first reference signal sequence, where the first reference signal sequence carries indication information, and the indication information is used to indicate the first paging position at which the first paging message is located. Before sending the first paging message at the first paging position, the network device may first send a reference signal sequence. For example, the network device sends the first reference signal sequence. In this case, the first terminal device may receive the first reference signal sequence, where the first reference signal sequence carries the indication information of the first paging message transmitted at the first paging position, and the indication information of the first paging message is used to indicate an offset value of the first paging occasion relative to the second paging occasion.

In a possible implementation of the first aspect, the indication information is further used to indicate that the first paging message corresponds to the first paging occasion in the time window. Because the channel listening on the first paging occasion fails, the first paging message cannot be sent. Therefore, the first paging message is sent by using the first paging position corresponding to the second paging occasion. The first terminal device may determine, by parsing the indication information, that the first paging message at the first paging position corresponding to the second paging occasion corresponds to the first paging occasion.

In a possible implementation of the first aspect, the first reference signal sequence is used to indicate start position information of signal sending. The first reference signal sequence may be an initial reference signal sequence indicating a start of signal transmission. For example, a transmitted signal may be a control channel, a synchronization signal, a broadcast channel, a downlink reference signal, or any other downlink signal.

In a possible implementation of the first aspect, a quantity of paging occasions included in the time window is predefined, or a quantity of paging occasions is sent by the network device to the first terminal device. The network device may predefine the quantity of paging occasions included in the time window, and the first terminal device may determine, in a predefined manner, the quantity of paging occasions included in the time window. Alternatively, after the network device determines the quantity of paging occasions included in the time window, the network device may further send a notification message to the first terminal device, so that the first terminal device determines, based on the notification message, the quantity of paging occasions included in the time window.

According to a second aspect, an embodiment of this application further provides a paging method. The method includes: A network device determines a first paging occasion of a first terminal device; and when channel listening performed by the network device on the first paging occasion fails, the network device sends a first paging message in a time window, where a start position of the time window is determined based on the first paging occasion, and the time window includes at least one paging occasion. In this embodiment of this application, the network device may determine the first paging occasion used to send the first paging message. If the network device cannot actually send the paging message on the first paging occasion, the network device may transfer the first paging occasion that cannot be actually used because the channel listening fails to a next paging occasion in the time window, and the first terminal device may receive the first paging message on another paging occasion in the time window based on the first paging occasion. Therefore, transmission efficiency of the paging message is improved.

In a possible implementation of the second aspect, each paging occasion included in the time window corresponds to at least one paging position, and different paging positions occupy different bandwidth areas. For example, each paging occasion corresponds to at least two paging positions, and different paging positions occupy different bandwidth areas. One bandwidth area may be one bandwidth part, or one bandwidth area may be one subband. For example, the subband is a bandwidth of 20 MHz or a bandwidth of 40 MHz. For a plurality of paging positions corresponding to the first paging occasion, these paging positions occupy different bandwidth areas in frequency domain.

In a possible implementation of the second aspect, that the network device sends a first paging message in a time window includes: If the time window further includes a second paging occasion, the network device sends the first paging message to the first terminal device on the second paging occasion; and the network device sends a second paging message to a second terminal device on the second paging occasion. The time window includes the first paging occasion and the second paging occasion. When the channel listening performed by the network device on the first paging occasion fails, the network device may simultaneously send paging messages to the first terminal device and the second terminal device on the second paging occasion in the time window. For example, the network device sends the first paging message to the first terminal device on the second paging occasion, and the network device sends the second paging message to the second terminal device on the second paging occasion. Correspondingly, the first terminal device may determine the second paging occasion in the time window. In this case, the first terminal device may receive the first paging message on the second paging occasion. Therefore, a problem that the paging message cannot be transmitted because the channel listening on the first paging occasion fails is resolved.

In a possible implementation of the second aspect, that the network device sends the first paging message to the first terminal device on the second paging occasion and that the network device sends a second paging message to a second terminal device on the second paging occasion include: If the second paging occasion corresponds to at least two paging positions, the network device sends the first paging message to the first terminal device at a first paging position corresponding to the second paging occasion; and the network device sends the second paging message to the second terminal device at a second paging position corresponding to the second paging occasion. The first terminal device receives the first paging message at the first paging position corresponding to the second paging occasion, and the second terminal device may receive the second paging message at the second paging position corresponding to the second paging occasion.

In a possible implementation of the second aspect, the second paging position is a paging position corresponding to a bandwidth area with a smallest index or a paging position corresponding to a bandwidth area with a largest index. It may be directly defined that the paging position corresponding to the bandwidth area with the smallest index or the paging position corresponding to the bandwidth area with the largest index is the second paging position, where the smallest index means that an index of a bandwidth area is the smallest, the largest index means that an index of a bandwidth area is the largest, the bandwidth area herein refers to a bandwidth range occupied by signal transmission, and the bandwidth area may be a subband in frequency domain.

In a possible implementation of the second aspect, before the network device sends the first paging message in the time window, the method further includes: The network device sends a first reference signal sequence to the first terminal device, where the first reference signal sequence carries indication information, and the indication information is used to indicate the first paging position at which the first paging message is located.

In a possible implementation of the second aspect, the indication information is further used to indicate that the first paging message corresponds to the first paging occasion in the time window. Because the channel listening on the first paging occasion fails, the first paging message cannot be sent. Therefore, the first paging message is sent by using the first paging position corresponding to the second paging occasion. The first terminal device may determine, by parsing the indication information, that the first paging message at the first paging position corresponding to the second paging occasion corresponds to the first paging occasion.

In a possible implementation of the second aspect, the first reference signal sequence is used to indicate start position information of signal sending. The first reference signal sequence may be an initial reference signal sequence indicating a start of signal transmission. For example, a transmitted signal may be a control channel, a synchronization signal, a broadcast channel, a downlink reference signal, or any other downlink signal.

In a possible implementation of the second aspect, a quantity of paging occasions included in the time window is predefined, or a quantity of paging occasions is sent by the network device to the first terminal device. The network device may predefine the quantity of paging occasions included in the time window, and the first terminal device may determine, in a predefined manner, the quantity of paging occasions included in the time window. Alternatively, after the network device determines the quantity of paging occasions included in the time window, the network device may further send a notification message to the first terminal device, so that the first terminal device determines, based on the notification message, the quantity of paging occasions included in the time window.

According to a third aspect, an embodiment of this application provides a communication method. The method includes: A terminal device sends K times of first preambles to a network device, where the first preamble is any preamble that needs to be sent by the terminal device to the network device, the K times of first preambles correspond to K pieces of downlink control information, the K pieces of downlink control information are scrambled by using a first scrambling code, and K is a positive integer greater than 1; and the terminal device receives, in a detection time window of the downlink control information based on the first scrambling code, at least one of the K pieces of downlink control information sent by the network device. In this embodiment of this application, the network device sends the K pieces of downlink control information, and the downlink control information may include scheduling information of a random access response message. Because the network device performs scrambling by using the same first scrambling code, the terminal device needs to receive, in the detection time window, only at least one of the K pieces of downlink control information by using the same first scrambling code. For the terminal device, there is no need to perform a plurality of detection attempts on a plurality of downlink control channels scrambled by using different RNTIs. Therefore, detection complexity of the terminal device can be greatly reduced.

In a possible implementation of the third aspect, the K times of first preambles correspond to K random access resources, and the first scrambling code is determined based on a first random access resource in the K random access resources. The network device sends the K pieces of downlink control information for the K times of first preambles. The K pieces of downlink control information are scrambled by using a same scrambling code, and the same used scrambling code is represented as the first scrambling code. For example, the first scrambling code is determined based on the first random access resource in the K random access resources. In other words, the terminal device may determine, based on only the first random access resource, the first scrambling code used to scramble the K pieces of downlink control information, and there is no need to separately calculate scrambling codes of the K pieces of downlink control information for the K random access resources corresponding to the K times of first preambles. In addition, the terminal device needs to perform only one detection attempt on a plurality of downlink control channels scrambled by using a same RNTI, so that detection complexity of the terminal device can be greatly reduced.

In a possible implementation of the third aspect, the first random access resource is a predefined random access resource; or the first random access resource is configured by the network device for the terminal device. A network device side and a terminal device side may predefine the first random access resource, for example, predetermine that the first random access resource is a determined random access resource in the K random access resources. For example, the first random access resource is the 1$^{st}$ random access resource in the K random access resources or the last random access resource in the K random access resources. This is not specifically limited herein. The terminal device may determine the first random access resource in the predefined manner or according to the predefined rule. Alternatively, after determining the first random access resource, the network device may further send indication information of the first random access resource to the terminal device, so that the terminal device determines the first random access resource in the K random access resources based on the indication information.

In a possible implementation of the third aspect, the K times of first preambles correspond to K random access resources, where the K random access resources belong to a first random access resource group, and the first random access resource group is predefined, or the first random access resource group is configured by the network device for the terminal device. The network device may predefine the first random access resource group. For example, information about a random access resource included in the first random access resource group is determined according to a predefined rule. The predefined rule is optionally as follows: K consecutive random access resources in time domain and/or frequency domain form the first random access resource group, and so on. This is not specifically limited herein. In this case, the terminal device may determine the first random access resource group in a predefined manner. Alternatively, after determining the first random access resource group, the network device may further send indication information of the first random access resource group to the terminal device, so that the terminal device determines the first random access resource group based on the indication information.

According to a fourth aspect, an embodiment of this application provides a communication method. The method includes: A network device receives K times of first preambles sent by a terminal device, where the first preamble is any preamble that needs to be sent by the terminal device to the network device, and K is a positive integer greater than 1; the network device scrambles K pieces of downlink control information by using a first scrambling code; and the network device sends the K pieces of downlink control information to the terminal device. In this embodiment of this application, the network device sends the K pieces of downlink control information, and the downlink control information may include scheduling information of a random access response message. Because the network device performs scrambling by using the same first scrambling code, the terminal device needs to receive, in a detection time window, only at least one of the K pieces of downlink control information by using the same first scrambling code. For the terminal device, there is no need to perform a plurality of detection attempts on a plurality of downlink control channels scrambled by using different RNTIs. Therefore, detection complexity of the terminal device can be greatly reduced.

In a possible implementation of the fourth aspect, the K times of first preambles correspond to K random access resources, and the first scrambling code is determined based on a first random access resource in the K random access resources.

In a possible implementation of the fourth aspect, the first random access resource is a predefined random access resource; or the first random access resource is configured by the network device for the terminal device.

In a possible implementation of the fourth aspect, the K times of first preambles correspond to K random access resources, where the K random access resources belong to a first random access resource group, and the first random access resource group is predefined, or the first random access resource group is configured by the network device for the terminal device.

According to a fifth aspect, an embodiment of this application provides a first terminal device. The first terminal device includes a processing module and a receiving module. The processing module is configured to determine, in a discontinuous reception periodicity, a first paging occasion of the first terminal device. The processing module is further configured to: when channel listening on the first paging occasion fails, receive, through the receiving module, a first paging message in a time window, where a start position of the time window is determined based on the first paging occasion, and the time window includes at least one paging occasion.

In a possible implementation of the fifth aspect, each paging occasion included in the time window corresponds to at least one paging position, and different paging positions occupy different bandwidth areas.

In a possible implementation of the fifth aspect, the time window further includes a second paging occasion, and the processing module is further configured to receive, through the receiving module, the first paging message on the second paging occasion.

In a possible implementation of the fifth aspect, the second paging occasion corresponds to at least two paging positions, and the processing module is further configured to receive, through the receiving module, the first paging message at a first paging position corresponding to the second paging occasion, where a second paging position corresponding to the second paging occasion is used by a second terminal device to receive a second paging message.

In a possible implementation of the fifth aspect, the second paging position is a paging position corresponding to a bandwidth area with a smallest index or a paging position corresponding to a bandwidth area with a largest index.

In a possible implementation of the fifth aspect, the processing module is further configured to receive, through the receiving module, a first reference signal sequence before receiving, through the receiving module, the first paging message at the first paging position corresponding to the second paging occasion, where the first reference signal sequence carries indication information, and the indication information is used to indicate the first paging position at which the first paging message is located.

In a possible implementation of the fifth aspect, the indication information is further used to indicate that the first paging message corresponds to the first paging occasion in the time window.

In a possible implementation of the fifth aspect, the first reference signal sequence is used to indicate start position information of signal sending.

In a possible implementation of the fifth aspect, a quantity of paging occasions included in the time window is predefined, or a quantity of paging occasions is sent by a network device to the first terminal device.

In the fifth aspect of this application, the composition modules of the first terminal device may further perform the steps described in the first aspect and the possible implementations thereof. For details, refer to the descriptions in the first aspect and the possible implementations thereof.

According to a sixth aspect, an embodiment of this application provides a network device. The network device includes a processing module and a sending module. The processing module is configured to determine a first paging occasion of a first terminal device. The processing module is further configured to: when channel listening performed by the network device on the first paging occasion fails, send, through the sending module, a first paging message in a time window, where a start position of the time window is determined based on the first paging occasion, and the time window includes at least one paging occasion.

In a possible implementation of the sixth aspect, each paging occasion included in the time window corresponds to at least one paging position, and different paging positions occupy different bandwidth areas.

In a possible implementation of the sixth aspect, the time window further includes a second paging occasion, and the processing module is further configured to: send, through the sending module, the first paging message to the first terminal device on the second paging occasion; and send, through the sending module, a second paging message to a second terminal device on the second paging occasion.

In a possible implementation of the sixth aspect, the second paging occasion corresponds to at least two paging positions, and the processing module is further configured to: send, through the sending module, the first paging message to the first terminal device at a first paging position corresponding to the second paging occasion; and send, through the sending module, the second paging message to the second terminal device at a second paging position corresponding to the second paging occasion.

In a possible implementation of the sixth aspect, the second paging position is a paging position corresponding to a bandwidth area with a smallest index or a paging position corresponding to a bandwidth area with a largest index.

In a possible implementation of the sixth aspect, the processing module is further configured to send, through the sending module, a first reference signal sequence to the first terminal device before sending the first paging message in the time window, where the first reference signal sequence carries indication information, and the indication information is used to indicate the first paging position at which the first paging message is located.

In a possible implementation of the sixth aspect, the indication information is further used to indicate that the first paging message corresponds to the first paging occasion in the time window.

In a possible implementation of the sixth aspect, the first reference signal sequence is used to indicate start position information of signal sending.

In a possible implementation of the sixth aspect, a quantity of paging occasions included in the time window is predefined, or a quantity of paging occasions is sent by the sending module to the first terminal device.

In the sixth aspect of this application, the composition modules of the network device may further perform the steps described in the second aspect and the possible implementations thereof. For details, refer to the descriptions in the second aspect and the possible implementations thereof.

According to a seventh aspect, an embodiment of this application provides a terminal device. The terminal device includes a processing module, a sending module, and a receiving module. The processing module is configured to send, through the sending module, K times of first preambles to a network device, where the first preamble is any preamble that needs to be sent by the terminal device to the network device, the K times of first preambles correspond to K pieces of downlink control information, the K pieces of downlink control information are scrambled by using a first scrambling code, and K is a positive integer greater than 1. The processing module is further configured to receive, through the receiving module in a detection time window of the downlink control information based on the first scrambling code, at least one of the K pieces of downlink control information sent by the network device.

In a possible implementation of the seventh aspect, the K times of first preambles correspond to K random access resources, and the first scrambling code is determined based on a first random access resource in the K random access resources.

In a possible implementation of the seventh aspect, the first random access resource is a predefined random access resource; or the first random access resource is configured by the network device for the terminal device.

In a possible implementation of the seventh aspect, the K times of first preambles correspond to K random access resources, where the K random access resources belong to a first random access resource group, and the first random access resource group is predefined, or the first random access resource group is configured by the network device for the terminal device.

In the seventh aspect of this application, the composition modules of the terminal device may further perform the steps described in the third aspect and the possible implementations thereof. For details, refer to the descriptions in the third aspect and the possible implementations thereof.

According to an eighth aspect, an embodiment of this application provides a network device. The network device includes a processing module, a sending module, and a receiving module. The processing module is configured to receive, through the receiving module, K times of first preambles sent by a terminal device, where the first preamble is any preamble that needs to be sent by the terminal device to the network device, and K is a positive integer greater than 1. The processing module is configured to scramble K pieces of downlink control information by using a first scrambling code. The processing module is configured to send, through the sending module, the K pieces of downlink control information to the terminal device.

In a possible implementation of the eighth aspect, the K times of first preambles correspond to K random access resources, and the first scrambling code is determined based on a first random access resource in the K random access resources.

In a possible implementation of the eighth aspect, the first random access resource is a predefined random access resource; or
the first random access resource is configured by the network device for the terminal device.

In a possible implementation of the eighth aspect, the K times of first preambles correspond to K random access resources, where the K random access resources belong to a first random access resource group, and the first random access resource group is predefined, or the first random access resource group is configured by the network device for the terminal device.

In the eighth aspect of this application, the composition modules of the network device may further perform the steps described in the fourth aspect and the possible implementations thereof. For details, refer to the descriptions in the fourth aspect and the possible implementations thereof.

According to a ninth aspect, an embodiment of this application provides a computer-readable storage medium. The computer-readable storage medium stores instructions. When the instructions are run on a computer, the computer is enabled to perform the method according to the first aspect.

According to a tenth aspect, an embodiment of this application provides a computer-readable storage medium. The computer-readable storage medium stores instructions. When the instructions are run on a computer, the computer is enabled to perform the method according to the second aspect.

According to an eleventh aspect, an embodiment of this application provides a computer-readable storage medium. The computer-readable storage medium stores instructions. When the instructions are run on a computer, the computer is enabled to perform the method according to the third aspect.

According to a twelfth aspect, an embodiment of this application provides a computer-readable storage medium. The computer-readable storage medium stores instructions. When the instructions are run on a computer, the computer is enabled to perform the method according to the fourth aspect.

According to a thirteenth aspect, an embodiment of this application provides a computer program product including instructions. When the computer program product runs on a computer, the computer is enabled to perform the method according to the first aspect.

According to a fourteenth aspect, an embodiment of this application provides a computer program product including instructions. When the computer program product runs on a computer, the computer is enabled to perform the method according to the second aspect.

According to a fifteenth aspect, an embodiment of this application provides a computer program product including instructions. When the computer program product runs on a computer, the computer is enabled to perform the method according to the third aspect.

According to a sixteenth aspect, an embodiment of this application provides a computer program product including instructions. When the computer program product runs on a computer, the computer is enabled to perform the method according to the fourth aspect.

According to a seventeenth aspect, an embodiment of this application provides a communications apparatus. The communications apparatus may include an entity such as a terminal device or a chip. The communications apparatus includes a processor and a memory. The memory is configured to store instructions, and the processor is configured to execute the instructions in the memory, so that the communications apparatus performs the method according to the first aspect.

According to an eighteenth aspect, an embodiment of this application provides a communications apparatus. The communications apparatus may include an entity such as a network device or a chip. The communications apparatus includes a processor and a memory. The memory is configured to store instructions, and the processor is configured to execute the instructions in the memory, so that the communications apparatus performs the method according to the second aspect.

According to a nineteenth aspect, an embodiment of this application provides a communications apparatus. The communications apparatus may include an entity such as a terminal device or a chip. The communications apparatus includes a processor and a memory. The memory is configured to store instructions, and the processor is configured to execute the instructions in the memory, so that the communications apparatus performs the method according to the third aspect.

According to a twentieth aspect, an embodiment of this application provides a communications apparatus. The communications apparatus may include an entity such as a network device or a chip. The communications apparatus includes a processor and a memory. The memory is configured to store instructions, and the processor is configured to execute the instructions in the memory, so that the communications apparatus performs the method according to the fourth aspect.

According to a twenty-first aspect, this application provides a chip system. The chip system includes a processor, configured to support a terminal device in implementing a function in the first aspect, for example, in sending or processing the data and/or information in the foregoing method. In a possible design, the chip system further includes a memory, and the memory is configured to store a program instruction and data that are necessary for the terminal device. The chip system may include a chip, or may include a chip and another discrete component.

According to a twenty-second aspect, this application provides a chip system. The chip system includes a processor, configured to support a terminal device in implementing a function in the second aspect, for example, in sending or processing the data and/or information in the foregoing method. In a possible design, the chip system further includes a memory, and the memory is configured to store a program instruction and data that are necessary for the network device. The chip system may include a chip, or may include a chip and another discrete component.

According to a twenty-third aspect, this application provides a chip system. The chip system includes a processor, configured to support a terminal device in implementing a function in the third aspect, for example, in sending or processing the data and/or information in the foregoing method. In a possible design, the chip system further includes a memory, and the memory is configured to store a program instruction and data that are necessary for the terminal device. The chip system may include a chip, or may include a chip and another discrete component.

According to a twenty-fourth aspect, this application provides a chip system. The chip system includes a processor, configured to support a terminal device in implementing a function in the fourth aspect, for example, in sending or processing the data and/or information in the foregoing method. In a possible design, the chip system further includes a memory, and the memory is configured to store a program instruction and data that are necessary for the network device. The chip system may include a chip, or may include a chip and another discrete component.

DETAILED DESCRIPTION OF EMBODIMENTS

Figure 1:
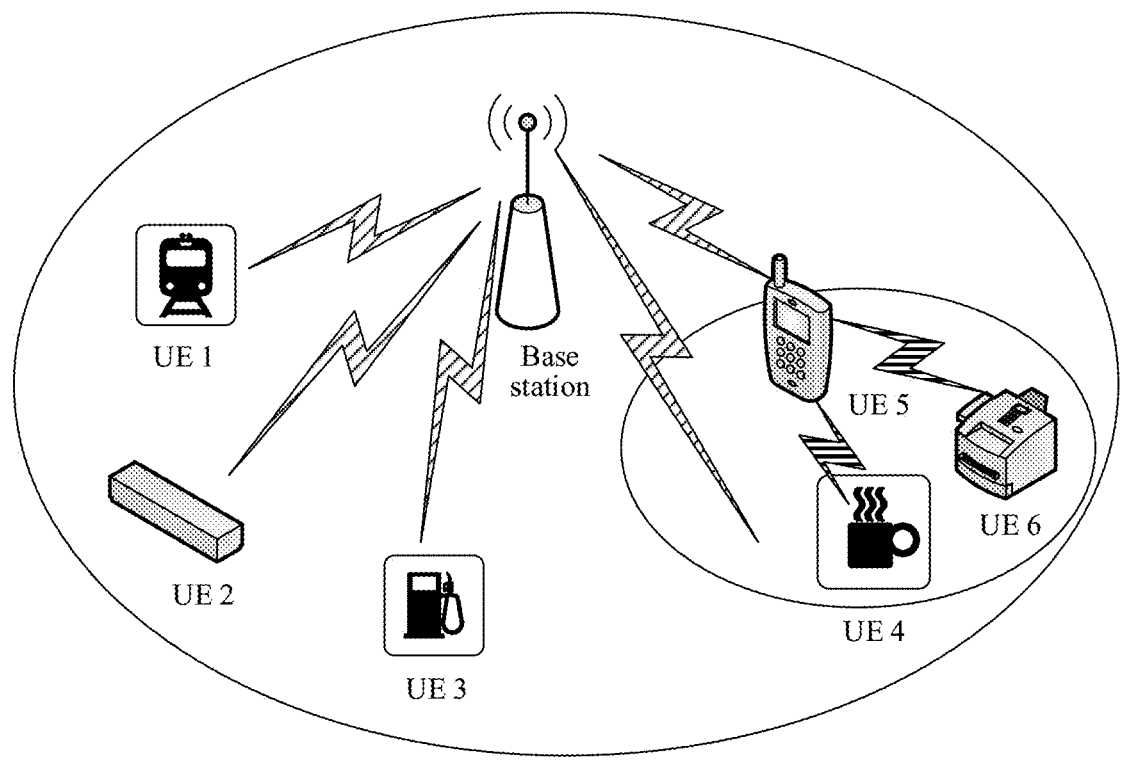
FIG. 1 is a schematic structural diagram of a communications system to which a paging method is applicable according to an embodiment of this application.

Embodiments of this application provide a paging method, a terminal device, and a network device, to improve transmission efficiency of a paging message.

The following describes the embodiments of this application with reference to the accompanying drawings.

In this specification, the claims, and the accompanying drawings of this application, the terms "first", "second", and the like are intended to distinguish between similar objects but do not necessarily indicate a specific order or sequence. It should be understood that the terms used in such a way are interchangeable in a proper circumstance, which is merely a discrimination manner that is used when objects having a same attribute are described in the embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

Technical solutions in the embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system may implement wireless technologies such as universal radio terrestrial access (, UTRA) and CDMA2000. The UTRA may include a wideband CDMA (WCDMA) technology and other variant technologies of CDMA. The CDMA2000 may cover the interim standard (IS) 2000 (IS-2000), the IS-95 standard, and the IS-856 standard. The TDMA system can implement wireless technologies such as a global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. The UTRA corresponds to UMTS, and the E-UTRA corresponds to an evolved version of the UMTS. In 3GPP, long term evolution (LTE) and various versions evolved based on the LTE are new UMTS versions using the E-UTRA. A 5th generation ("5G" for short) communications system or new radio ("NR" for short) is a next generation communications system under study. In addition, the communications system is further applicable to a future-oriented communications technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

FIG. 1 is a schematic structural diagram of a communications system to which a paging method is applicable according to an embodiment of this application. The communications system may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one network device or a plurality of network devices. The network device may be any device with a wireless transceiver function, or a chip disposed in a device with a wireless transceiver function. The network device includes but is not limited to a base station (for example, a base station BS, a NodeB, an evolved NodeB eNodeB or eNB, a gNodeB or gNB in a fifth generation 5G communications system, a base station in a future communications system, an access node in a Wi-Fi system, a wireless relay node, or a wireless backhaul node) and the like. The base station may be a macro base station, a micro base station, a pico base station, a small cell, a relay station, or the like. A plurality of base stations may support a network using the foregoing one or more technologies, or a future evolved network. The core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminals are connected to a RAN node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and is a device that provides voice and/or data connectivity for a user, or is a chip disposed in the device, for example, a handheld device or a vehicle-mounted device with a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home. The terminal device provided in this embodiment of this application may be a low-complexity terminal device and/or a terminal device in a coverage enhancement mode A.

In this embodiment of this application, the base station and the UE 1 to the UE 6 form a communications system. In the communications system, the base station sends one or more of system information, a RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

A paging message sent by a network device to a terminal device is carried on an air interface by using a physical downlink shared channel (PDSCH). Before receiving the paging message, the terminal device needs to first listen to a physical downlink control channel (PDCCH), and then determine, based on whether the PDCCH carries a paging radio network temporary identifier (P-RNTI), whether a network sends a paging message to the terminal device in a current paging periodicity. A terminal device in idle mode may use a discontinuous reception (DRX) function to reduce power consumption and increase a battery lifespan. To be specific, in a DRX cycle periodicity, the terminal may receive control information only at a time position at which a paging occasion occurs, and then receive data based on a requirement. The terminal device may sleep at a time outside the DRX cycle periodicity, to save power. The DRX cycle periodicity may also be referred to as a DRX periodicity. In addition, for the terminal device in idle mode, if the terminal device wakes up frequently to receive a paging message, power consumption of the terminal device also increases. Consequently, power cannot be saved and the battery lifespan cannot be increased.

In a DRX periodicity, the terminal device listens to, only on a paging occasion PO of a corresponding paging frame (PF), whether a PDCCH carries a P-RNTI, to determine whether a corresponding PDSCH carries a paging message. If the PDCCH carries a P-RNTI, the terminal device receives data on the PDSCH based on a parameter that is of the PDSCH and that is indicated on the PDCCH. If the terminal device does not parse a P-RNTI on the PDCCH, the terminal device does not need to receive the PDSCH, and may sleep according to the DRX periodicity. By using such a mechanism, in a DRX periodicity, the terminal may receive the PDCCH at a time position at which a PO appears, and then receive the PDSCH based on a requirement. The terminal may sleep at another time, to save power.

Figure 2:
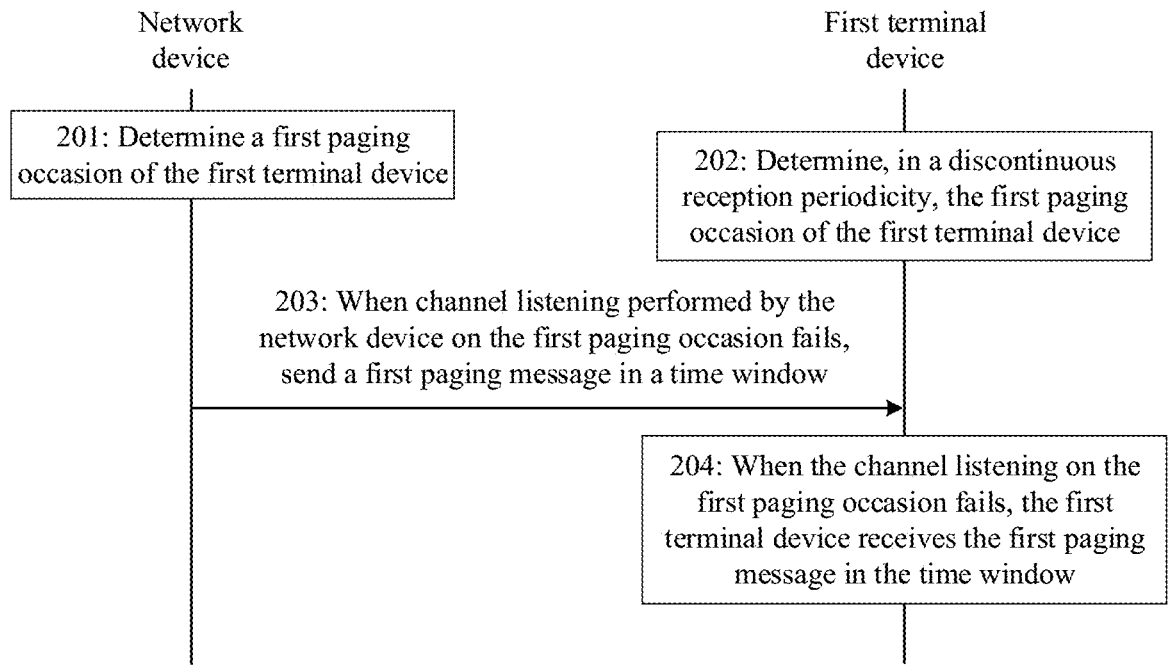
FIG. 2 is a schematic flowchart of interaction between a network device and a first terminal device according to an embodiment of this application.

To resolve a conventional-technology problem that a quantity of paging occasions is reduced because LBT performed by a terminal device in a DRX periodicity fails, an embodiment of this application provides the following paging method. FIG. 2 is a schematic flowchart of interaction between a network device and a first terminal device according to this embodiment of this application. The paging method provided in this embodiment of this application mainly includes the following steps.

201: The network device determines a first paging occasion of the first terminal device.

In this embodiment of this application, when the network device needs to communicate with the first terminal device, the network device first determines the first paging occasion. The first paging occasion is a paging occasion allocated to the first terminal device.

In this embodiment of this application, each paging frame includes a plurality of paging occasions. For example, one paging frame may include four paging occasions. When the network device needs to communicate with the first terminal device, the network device first determines a paging occasion that is of a paging frame and on which the first terminal device performs listening and paging message receiving. For example, the first paging occasion is a paging occasion on which the first terminal device may perform the listening and receiving. By using configurations of the paging frame and the paging occasion, the network device and the terminal device may determine, according to a predefined rule, a candidate position of the paging occasion in time domain.

In some embodiments of this application, that the network device determines a first paging occasion of the first terminal device in step 201 includes:

The network device determines the first paging occasion of the first terminal device based on an identifier of the first terminal device.

The first paging occasion may be determined by the network device based on the identifier of the first terminal device. For example, the network device determines the first paging occasion based on a UE ID of the first terminal device. There may be a plurality of types of the identifier of the first terminal device. For example, the first paging occasion may be determined based on an international mobile subscriber identity (IMSI) of the first terminal device.

202: The first terminal device determines, in a discontinuous reception periodicity, the first paging occasion of the first terminal device.

In this embodiment of this application, one discontinuous reception periodicity includes at least one paging frame, and each paging frame includes at least one paging occasion. The first terminal device determines, according to the predefined rule, to attempt to detect and receive a paging message on a paging occasion of a paging frame. For example, the first paging occasion is determined by the first terminal device based on configurations that are of the paging frame and the paging occasion and that are sent by the network device to the terminal device, and the first terminal device may determine, according to the predefined rule, a candidate position of the paging occasion in time domain.

In some embodiments of this application, that the first terminal device determines, in a discontinuous reception periodicity, the first paging occasion of the first terminal device in step 202 includes:

The first terminal device determines, in the discontinuous reception periodicity, the first paging occasion of the first terminal device based on the identifier of the first terminal device.

The first paging occasion may be determined by the first terminal device based on the identifier of the first terminal device. For example, the first terminal device determines the first paging occasion based on the UE ID. There may be a plurality of types of the identifier of the first terminal device. For example, the first paging occasion may be determined based on the IMSI of the first terminal device.

203: When channel listening performed by the network device on the first paging occasion fails, the network device sends a first paging message in a time window, where a start position of the time window is determined based on the first paging occasion, and the time window includes at least one paging occasion.

In some embodiments of this application, a quantity of paging occasions included in the time window is predefined or is sent by the network device to the first terminal device. The network device may predefine the quantity of paging occasions included in the time window. For example, one time window may include eight paging occasions. In this case, the first terminal device may determine, in a predefined manner, the quantity of paging occasions included in the time window. Alternatively, after the network device determines the quantity of paging occasions included in the time window, the network device may further send a notification message to the first terminal device, so that the first terminal device determines, based on the notification message, the quantity of paging occasions included in the time window.

In this embodiment of this application, after determining the first paging occasion of the first terminal device, the network device performs, before transmission, channel listening on the first paging occasion or before the first paging occasion. In other words, the network device may perform LBT on the first paging occasion or before the first paging occasion. If the channel listening succeeds, it indicates that the network device preempts a resource for signal transmission, and the network device may send the first paging message to the first terminal device on the resource. If the channel listening fails, it indicates that the network device does not preempt a resource for signal transmission. In this case, the network device cannot send the first paging message on the first paging occasion. For a case in which the channel listening performed by the network device on the first paging occasion fails, in this embodiment of this application, the network device continues to attempt to send the first paging message in the time window determined based on the first paging occasion. Therefore, a quantity of times of sending the paging message is increased, and transmission efficiency of the paging message is ensured.

In this embodiment of this application, the time window is a time period or a time unit including at least one paging occasion, and the start position of the time window is determined based on the first paging occasion. The start position of the time window may be determined based on a time domain position of the first paging occasion when the channel listening fails. Further, the start position of the time window may alternatively be a time domain position of the $1^{st}$ available paging occasion after the first paging occasion when the channel listening fails. In other words, the start position of the time window may be the time domain position of the first paging occasion or another time domain position determined based on the first paging occasion. This is not specifically limited herein. In addition, the time window may include the first paging occasion and a second paging occasion, or the time window may not include the first paging occasion and the time window includes a second paging occasion. In this embodiment of this application, duration of the time window may be predefined or is configured by the network device for the first terminal device. In this embodiment of this application, the duration of the time window is less than or equal to one discontinuous reception periodicity, and the time window is in one discontinuous reception periodicity. The first terminal device needs to wake up only in one time window in a discontinuous reception periodicity. The time window may be a time range. For example, the time window may be a time unit, may be a time offset length, or may be in a form of a quantity of paging occasions. This is not limited herein.

In this embodiment of this application, the time window is a time period or a time unit including at least two paging occasions, and the start position of the time window is determined based on the first paging occasion. The start position of the time window may be determined based on a time domain position of the first paging occasion when the channel listening fails. Further, the start position of the time window may alternatively be a time domain position of the $1^{st}$ available paging occasion after the first paging occasion when the channel listening fails. In other words, the start position of the time window may be the time domain position of the first paging occasion or another time domain position determined based on the first paging occasion. This is not specifically limited herein. In addition, the time window may include the first paging occasion and a second paging occasion, or the time window may not include the first paging occasion and the time window includes a second paging occasion and a third paging occasion. The time window may be a time range. For example, the time window may be a time unit, may be a time offset length, or may be in a form of a quantity of paging occasions. This is not limited herein.

In this embodiment of this application, a time window is predefined or the network device configures a time window for the first terminal device. The time window includes at least one paging occasion. When the channel listening on the first paging occasion fails, a next available paging occasion may be offset to in the time window based on the first paging occasion, and the next available paging occasion is used to transmit the first paging message. The first paging message is a paging message that cannot be actually sent to the first terminal device because the channel listening fails. An example is used for description below. If the first paging message cannot be actually sent on the first paging occasion determined in time domain because the LBT fails, a base station may send the first paging message on another available paging occasion in the time window.

In some embodiments of this application, that the network device sends a first paging message in a time window in step 203 includes:

If the time window further includes the second paging occasion, the network device sends the first paging message to the first terminal device on the second paging occasion; and the network device sends a second paging message to a second terminal device on the second paging occasion.

The time window includes the first paging occasion and the second paging occasion. When the channel listening performed by the network device on the first paging occasion fails, the network device may simultaneously send paging messages to the first terminal device and the second terminal device on the second paging occasion in the time window. For example, the network device sends the first paging message to the first terminal device on the second paging occasion, and the network device sends the second paging message to the second terminal device on the second paging occasion. Correspondingly, the first terminal device may determine the second paging occasion in the time window. In this case, the first terminal device may receive the first paging message on the second paging occasion. Therefore, a problem that the paging message cannot be transmitted because the channel listening on the first paging occasion fails is resolved.

In some embodiments of this application, that the network device sends the first paging message to the first terminal device on the second paging occasion and that the network device sends a second paging message to a second terminal device on the second paging occasion include:

If the second paging occasion corresponds to at least two paging positions, the network device sends the first paging message to the first terminal device at a first paging position corresponding to the second paging occasion; and the network device sends the second paging message to the second terminal device at a second paging position corresponding to the second paging occasion.

The second paging occasion corresponds to the first paging position and the second paging position in frequency domain. In this case, the network device may use one (for example, the first paging position) of the two paging positions corresponding to the second paging occasion to send the first paging message to the first terminal device, and use the other (for example, the second paging position) of the two paging positions corresponding to the second paging occasion to send the second paging message to the second terminal device. In this case, the first terminal device receives the first paging message at the first paging position corresponding to the second paging occasion, and the second terminal device may receive the second paging message at the second paging position corresponding to the second paging occasion.

In some embodiments of this application, before the network device sends the first paging message in the time window, the paging method provided in this embodiment of this application further includes:

The network device sends a first reference signal sequence to the first terminal device, where the first reference signal sequence carries indication information, and the indication information is used to indicate the first paging position at which the first paging message is located.

Before sending the first paging message at the first paging position, the network device may first send a reference signal sequence. For example, the network device sends the first reference signal sequence. In this case, the first terminal device may receive the first reference signal sequence, where the first reference signal sequence carries the indication information of the first paging message transmitted at the first paging position, and the indication information of the first paging message may be an index relative to the second paging occasion. The first terminal device parses the first reference signal sequence to obtain the indication information, and may determine, based on the indication information, the first paging position at which the first paging message corresponding to the first paging occasion is located. The first terminal device may determine, by receiving the first reference signal sequence, the first paging position at which the first paging message is located, so that the first terminal device may detect and receive the first paging message sent to the first terminal device at the first paging position.

204: When the channel listening on the first paging occasion fails, the first terminal device receives the first paging message in the time window, where the start position of the time window is determined based on the first paging occasion, and the time window includes at least one paging occasion.

In this embodiment of this application, after the first terminal device determines the first paging occasion of the first terminal device, if the channel listening performed by the network device on the first paging occasion fails, the network device cannot send the first paging message on the first paging occasion. In this case, the network device may determine the time window based on the first paging occasion, and the network device uses the next available paging occasion in the time window to send the first paging message. Therefore, the first terminal device may also determine the time window based on the first paging occasion, and attempt to detect and receive the first paging message in the time window. For descriptions of the time window, refer to the descriptions of the example in step 203.

In some embodiments of this application, each paging occasion included in the time window corresponds to at least one paging position, and different paging positions occupy different bandwidth areas.

Each paging occasion corresponds to at least one paging position in frequency domain. For example, each paging occasion corresponds to at least two paging positions, and different paging positions occupy different bandwidth areas. One bandwidth area may be one bandwidth part (BWP), or one bandwidth area may be one subband. For example, the subband is a bandwidth of 20 MHz or a bandwidth of 40 MHz. For a plurality of paging positions corresponding to the first paging occasion, these paging positions occupy different bandwidth areas in frequency domain.

In some embodiments of this application, that the first terminal device receives the first paging message in the time window in step 204 includes:

If the time window further includes the second paging occasion, the first terminal device receives the first paging message on the second paging occasion in the time window.

The time window includes the second paging occasion. When the channel listening performed by the network device on the first paging occasion fails, the network device determines the start position of the time window based on the first paging occasion. The network device may send the first paging message to the first terminal device on the second paging occasion in the time window. Correspondingly, the first terminal device may determine the second paging occasion in the time window. In this case, the first terminal device may receive the first paging message on the second paging occasion. Therefore, a problem that the paging message cannot be transmitted because the channel listening on the first paging occasion fails is resolved.

In some embodiments of this application, the second paging occasion may be a paging occasion of the second terminal device. In addition, the time window may further include the third paging occasion used by the first terminal device and the second terminal device, and the third paging occasion may be a paging occasion of a third terminal device. In this embodiment of this application, the first terminal device may further receive the first paging message on the third paging occasion. Therefore, transmission efficiency of the paging message is improved.

Further, in some embodiments of this application, each paging occasion in the time window corresponds to a plurality of paging positions. That the first terminal device receives the paging message on the second paging occasion in the time window includes:

If the second paging occasion corresponds to at least two paging positions, the first terminal device receives the first paging message at the first paging position corresponding to the second paging occasion, where the second paging position corresponding to the second paging occasion is used by the second terminal device to receive the second paging message.

The second paging occasion corresponds to the first paging position and the second paging position in frequency domain. In this case, the network device may use one (for example, the first paging position) of the two paging positions corresponding to the second paging occasion to send the first paging message to the first terminal device, and use the other (for example, the second paging position) of the two paging positions corresponding to the second paging occasion to send the second paging message to the second terminal device. In this case, the first terminal device receives the first paging message at the first paging position corresponding to the second paging occasion, and the second terminal device may receive the second paging message at the second paging position corresponding to the second paging occasion.

In some embodiments of this application, the first paging position corresponding to the second paging occasion may be implicitly determined. For example, the first paging position may be determined by the first terminal device based on the device identifier of the first terminal device. For example, the first terminal device determines the first paging position corresponding to the second paging occasion based on the UE ID. Therefore, the first terminal device may obtain the first paging position corresponding to the second paging occasion.

In some embodiments of this application, the second paging position is a predefined paging position. The network device may determine, in a predefined manner, the second paging position corresponding to the second paging occasion, so that the network device may send the second paging message to the second terminal device at the second paging position corresponding to the second paging occasion. Correspondingly, the second terminal device may receive the second paging message at the second paging position corresponding to the second paging occasion, that is, the second terminal device may receive, at the predefined second paging position, the second paging message sent by the network device.

Further, in some embodiments of this application, the second paging position is a paging position corresponding to a bandwidth area with a smallest index or a paging position corresponding to a bandwidth area with a largest index. The second terminal device may determine, in the predefined manner, the second paging position corresponding to the second paging occasion. There are a plurality of predefined manners. For example, it may be directly defined that the paging position corresponding to the bandwidth area with the smallest index or the paging position corresponding to the bandwidth area with the largest index is the second paging position, where the smallest index means that an index of a bandwidth area is the smallest, the largest index means that an index of a bandwidth area is the largest, the bandwidth area herein refers to a bandwidth range occupied by signal transmission, and the bandwidth area may be a subband in frequency domain. One bandwidth area may be one bandwidth part, or one bandwidth area may be one subband. For example, the subband is a bandwidth of 20 MHz or a bandwidth of 40 MHz. An example is used for description below. When channel listening performed by the network device on the second paging occasion succeeds, a to-be-transmitted paging message corresponding to the second paging occasion is mapped, by default, to a predefined subband in at least two subbands. For example, a subband corresponding to a smallest index may be the predefined second paging position, or a subband corresponding to a largest index may be the predefined second paging position, where the subband may be a channel bandwidth whose minimum granularity is an integer multiple of 20 MHz.

In some embodiments of this application, before the first terminal device receives the first paging message at the first paging position corresponding to the second paging occasion, the paging method provided in this embodiment of this application further includes:

The first terminal device receives the first reference signal sequence, where the first reference signal sequence carries the indication information, and the indication information is used to indicate the first paging position at which the first paging message is located.

Before sending the first paging message at the first paging position, the network device may first send a reference signal sequence. For example, the network device sends the first reference signal sequence. In this case, the first terminal device may receive the first reference signal sequence, where the first reference signal sequence carries the indication information of the first paging message transmitted at the first paging position, and the indication information of the first paging message is used to indicate an offset value of the first paging occasion relative to the second paging occasion. For example, if the second paging occasion is a current paging occasion, the indication information of the first paging message is used to indicate an offset value of the first paging occasion relative to the current paging occasion. The first terminal device parses the first reference signal sequence to obtain the indication information, and the first terminal device may determine, based on the indication information, the first paging position at which the first paging message is located. The first terminal device may determine, by receiving the first reference signal sequence, the first paging position at which the first paging message is located, so that the first terminal device may detect and receive the first paging message located at the first paging position.

In some embodiments of this application, the first reference signal sequence may be an initial signal sequence used to identify a start of data transmission, a demodulation reference signal sequence of a control channel, a channel state information reference signal sequence, a time-frequency synchronization tracking reference signal sequence, a synchronization signal sequence, or the like. This is not limited herein.

In some embodiments of this application, the indication information in the first reference signal sequence is further used to indicate that the paging message corresponds to the first paging occasion in the time window. In other words, the network device uses the indication information to indicate that the first paging message to be sent at the first paging position corresponds to the first paging occasion in the time window. Because the channel listening on the first paging occasion fails, the first paging message cannot be sent. Therefore, the first paging message is sent by using the first paging position corresponding to the second paging occasion. The first terminal device may determine, by parsing the indication information, that the first paging message at the first paging position corresponding to the second paging occasion corresponds to the first paging occasion.

In some embodiments of this application, the first reference signal sequence is further used to indicate start position information of signal sending. The first reference signal sequence may be an initial reference signal sequence indicating a start of signal transmission. For example, a transmitted signal may be a control channel, a synchronization signal, a broadcast channel, a downlink reference signal, or any other downlink signal. This is not specifically limited herein.

It can be learned from the descriptions of the example in the foregoing embodiment that in this embodiment of this application, the network device may determine the first paging occasion that is in the discontinuous reception periodicity and that is used to send the first paging message. If the network device cannot actually send the paging message on the first paging occasion, the network device may transfer the first paging occasion that cannot be actually used because the channel listening fails to the next paging occasion in the time window, and the first terminal device may receive the first paging message on another paging occasion in the time window based on the first paging occasion. Therefore, transmission efficiency of the paging message is improved.

To better understand and implement the foregoing solutions in this embodiment of this application, the following uses a corresponding application scenario as an example for specific description.

Figure 3:
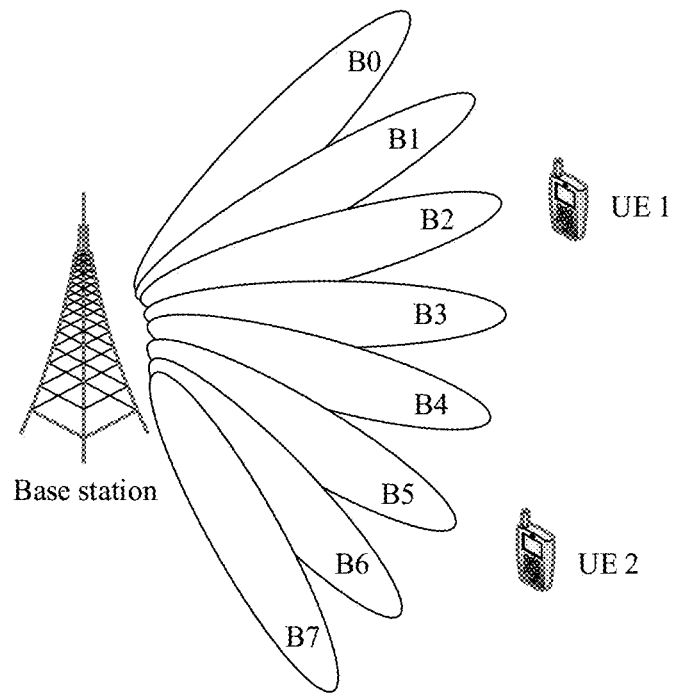
FIG. 3 is a schematic diagram of sending a paging message by a base station by using a plurality of beams according to an embodiment of this application.

In this embodiment of this application, a transmission procedure of a paging message can be strengthened, to resolve a problem that a quantity of paging occasions is reduced because LBT fails. Network elements involved in this embodiment of this application are UE and a base station. FIG. 3 is a schematic diagram of sending a paging message by a base station by using a plurality of beams according to an embodiment of this application. In an NR licensed frequency band, when a network device needs to page UE, a network does not have context information of the UE, and does not know a beam that needs to be used to send a paging message to the UE. Therefore, scanning needs to be performed by using a plurality of beams, that is, the paging message is sent by using a plurality of beams, to achieve relatively good coverage.

A synchronization signal (SS) in a 5G system also supports multi-beam sending, so that UE in a cell can receive the synchronization signal. Multi-beam sending of the synchronization signal is implemented by defining an SS burst signal set. One SS burst signal set includes one or more SS bursts, and one SS burst includes one or more SS blocks. One SS block is used to carry a synchronization signal of one beam. Therefore, one SS burst signal set includes synchronization signals whose quantity is the same as a quantity of SS blocks in the cell.

In a conventional technology, UE has only one PO in a DRX cycle periodicity, and one PO may include paging messages (that is, a plurality of paging occasions) of one cycle of beams. However, in an unlicensed spectrum, due to impact of an uncertain LBT result, when LBT performed by a base station fails and the base station fails to preempt a resource, some semi-static paging occasions or paging occasions determined according to a predefined rule cannot be normally sent. As a result, a quantity of paging occasions that can be actually sent by the base station is greatly reduced.

In this embodiment of this application, to send a paging message in an NR unlicensed spectrum, the following manner may be used.

The UE obtains, based on a system message, a DRX periodicity and configuration information used to determine a PF and a PO of a cell in the DRX periodicity. A set of PFs in the DRX periodicity and a quantity and positions of POs in each PF may be determined based on the configuration information. The UE determines, based on the set of PFs in the DRX periodicity, the quantity and positions of POs in each PF, and nB, a quantity of PFs included in a PO burst signal set. NB indicates a total quantity of POs in a DRX periodicity. NB is broadcast by a network in a system information broadcast (SIB) 2. A value of nB is 4T, 2T, T, T/2, T/4, T/8, T/16, or T/32. A unit is a radio frame.

The UE calculates, based on a UE ID, positions of a PF and a PO burst set that are used by the UE to receive a paging message in the DRX periodicity. In other words, different UEs respectively calculate PO burst sets of the UEs based on UE IDs of the UEs. For example, Nps indicates a quantity of PO burst sets in a DRX periodicity, and numbers of the PO burst sets in the DRX periodicity are 1, . . . , and Nps. In this case, a number of the PO burst set used by the UE for receiving=UE ID mod Nps.

Figure 4:
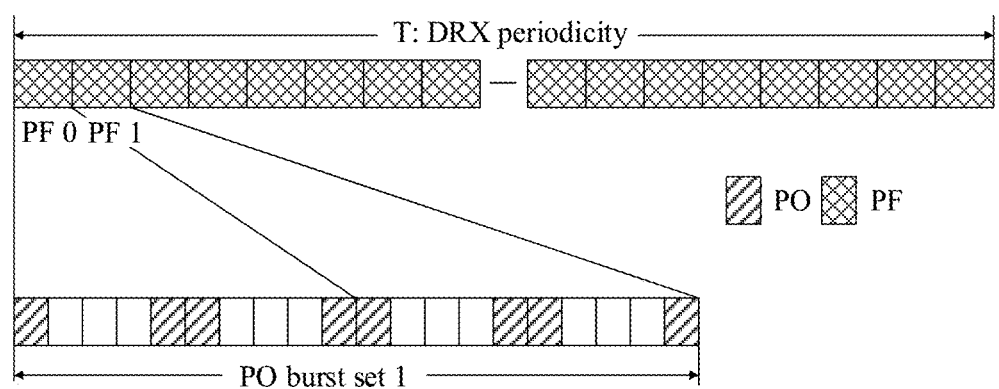
FIG. 4 is a schematic diagram of a relationship between a PF and a PO according to an embodiment of this application.

FIG. 4 is a schematic diagram of a relationship between a PF and a PO according to an embodiment of this application. One PO burst set includes POs in two PFs, that is, a PF 0 and a PF 1. Each PF includes four POs. Nb=8. If a DRX periodicity=32, Nps=16, and UE calculates, based on a UE ID of the UE, a position of a PO burst set in which the UE receives a paging message.

The following describes that the UE may calculate a paging position PF according to the following formula:

$$PF = SFN \bmod T = (T/N) \times (UE\ ID \bmod N).$$

The SFN is a system frame number, and radio frames corresponding to all values that are of the SFN and that satisfy the foregoing formula are PFs, and the PFs may be calculated according to the foregoing formula SFN mod T. After the first terminal device and the second terminal device in the foregoing embodiment obtain respective UE IDs, respective paging positions of the first terminal device and the second terminal device may be calculated according to the foregoing formula. A value range of the SFN is from 0 to 1023. Therefore, a PF periodically appears within the value range from 0 to 1023. mod represents a modulo operation, / represents division, and × represents multiplication.

T is a length of the DRX periodicity of the UE, and indicates a length of a paging periodicity. A unit is a radio frame (10 ms). T=min(Tc, Tue). That is, T takes a smaller value between Tc and Tue. Tc and Tue respectively indicate paging periodicities set on a core network side and on a wireless side. Usually, a paging periodicity on the wireless side is less than a periodicity on the core network side. T is by default equal to the paging periodicity on the wireless side. The parameter is read from the SIB2. Tc is obtained from a paging message in a SIB1.

N indicates a quantity of PFs in a DRX periodicity. N=min(T, nB). nB is read from the SIB2, and indicates a total quantity of POs in a DRX periodicity. nB is broadcast by a network in the SIB2. A value of nB may be any one of the following values: 4T, 2T, T, T/2, T/4, T/8, T/16, or T/32.

A unit is a radio frame. It is not limited that nB may also take another value other than the foregoing values.

The UE ID may be included in the paging message in the SIB1, and is calculated according to IMSI mod 1024, that is, the UE ID=IMSI mod 1024.

The following describes determining of a paging occasion. A paging occasion is a subframe number corresponding to a position that is of a paging occasion and that is included in a paging frame, and the moment may be obtained based on a correspondence between Ns and i_s, where Ns indicates a quantity of POs in a PF, and i_s indicates a sequence number of a PO in a PF. Frequency division duplex (FDD) is used as an example. A correspondence is shown in the following Table 1.

|        | i_s = 0    | i_s = 1    | i_s = 2    | i_s = 3    |
|--------|------------|------------|------------|------------|
| Ns = 1 | Subframe 9 | N/A        | N/A        | N/A        |
| Ns = 2 | Subframe 4 | Subframe 9 | N/A        | N/A        |
| Ns = 4 | Subframe 0 | Subframe 4 | Subframe 5 | Subframe 9 |

$Ns=\max(1, nB/T)$, and Ns indicates a quantity of POs in a PF.

$i\_s=\text{floor}(UE\ ID/N)\ \text{mod}\ Ns$.

The following describes calculation of a paging frame and a paging moment by using an example.

A default value of a paging periodicity is 128. In this case, T=128. If nB is set to T, that is, 128, N=128, and Ns=1.

Step 1: Calculation of a position of a paging frame. It is assumed that an IMSI of a user=448835805669362. In this case, the position of the paging frame is calculated according to the following formula:

The position of the paging frame PF=(T div N)*(UE ID mod N)=(128/128)*((448835805669362 mod 1024) mod 128)=114.

In this case, the position of the paging frame may appear in an SFN=(128*i)+114 (where i=0 to N, but SFN≤1024). For example, the position of the paging frame may be 114, 242, 370, 498, 626, 754, or 882.

Step 2: Determining of a paging occasion. Ns and i_s are calculated according to the following formulas:

$Ns=\max(1, nB/T)=1$; and $i\_s=\text{floor}(UE\ ID/N)\ \text{mod}\ Ns=\text{floor}((448835805669362\ \text{mod}\ 1024)/128)=0$.

According to the correspondence in Table 1, it can be learned, based on Ns=1 and i_s=0, that the PO=9, that is, the PO is at a position of the subframe 9 in the paging frame.

In the conventional technology, due to impact of an LBT result, a position that is of a paging occasion PO and that is determined according to the foregoing formula may be invalid. To compensate for a sending opportunity of the PO that is invalid due to an LBT failure, a time window may be predefined, or the base station configures a time window for the UE. When a PO that is at a moment i and that is determined according to the foregoing formula is invalid, the PO may be offset to a next available paging occasion in the time window, for example, offset to a PO(j). For the moment j, LBT performed by the base station on at least one subband succeeds; and the moment j is a paging transmit moment different from the moment i. One time window may include at least one paging occasion PO, and the at least one paging occasion herein is by default at least one paging occasion in time domain. A quantity of paging occasions POs included in one paging frame is configured for the UE by using system information, and a time domain position of each PO in each type of PO is predefined on a base station side and a UE side.

In addition, considering that data transmission on an unlicensed spectrum resource may usually occupy a higher transmission bandwidth, for example, 20 MHz, 40 MHz, 80 MHz, or 160 MHz, in a high bandwidth scenario, the base station needs to perform LBT on a plurality of 20 MHz subbands before data transmission. Similarly, data transmission can be performed only in a subband in which LBT succeeds. At a moment, LBT performed by the base station may succeed on a plurality of subbands, so that paging information transmission opportunities on the plurality of candidate subbands may be obtained. That the subband is of a minimum channel bandwidth of 20 MHz for signal transmission in an unlicensed spectrum is merely an example. It may be defined that the subband is of another non-20 MHz bandwidth value, for example, 40 MHz or 60 MHz. This is not specifically limited herein either.

At the sending moment j corresponding to the PO determined according to the foregoing formula, if LBT performed by the base station succeeds on at least two subbands, the PO corresponding to the moment j is by default mapped to a determined subband in the at least two subbands. Optionally, the determined subband may be a subband corresponding to a smallest subband index in the at least two subbands. Alternatively, the determined subband may be a subband corresponding to a largest subband index in the at least two subbands. This is not specifically limited herein. Another subband in the at least two subbands may be allocated to another PO on which previous LBT fails, for example, the PO at the moment i.

Further, a PO transmitted by the remaining subband may be determined based on a predefined rule, for example, implicitly determined based on a UE ID, or implicitly determined based on both a UE ID and a subband ID. This is not specifically limited herein.

A PO transmitted by the remaining subband may alternatively be explicitly indicated by the base station to the UE. For example, the base station carries, by using a reference signal sequence, information about a PO transmitted on each subband. Optionally, the reference signal sequence may be an initial signal sequence used to identify data transmission, a demodulation reference signal sequence of a control channel, a channel state information reference signal sequence, a synchronization signal sequence, or the like. This is not specifically limited herein.

To reduce a quantity of information bits carried in the reference signal sequence as much as possible and improve detection performance of the reference signal sequence, the indication information may indicate, by using a paging occasion PO corresponding to a current subband as a reference point, relative indexes of all time domain POs included in a time window relative to the current reference point. For example, it is assumed that a quantity of time domain POs included in the time window is 3, and the paging occasion PO corresponding to the current subband is the $3^{rd}$ PO in the time window, an indicator value of a relative index of another transferred PO relative to the reference PO is 1 or 2. Therefore, the reference signal sequence needs to carry only one bit.

Figure 5:
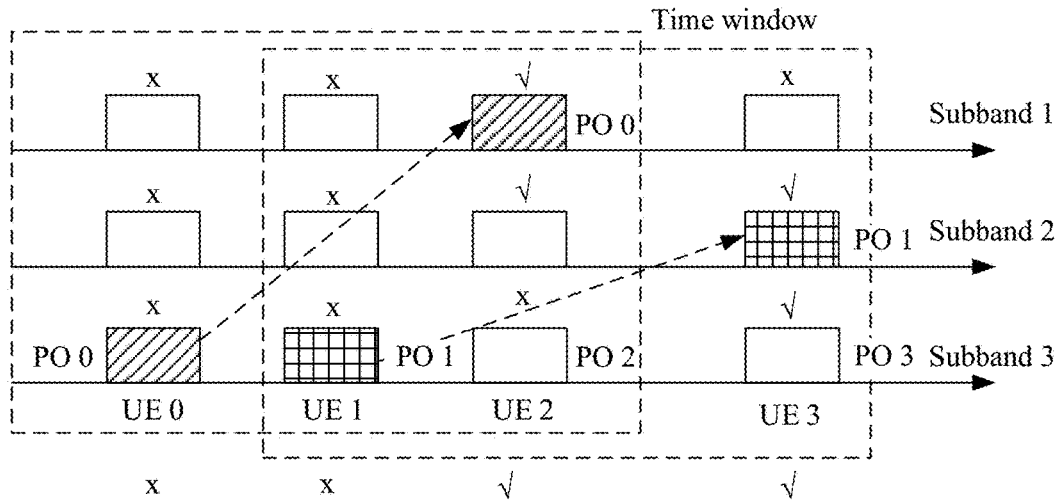
FIG. 5 is a schematic diagram of sending a paging message in a time window by using two POs according to an embodiment of this application.

FIG. 5 is a schematic diagram of sending a paging message in a time window by using two POs according to an embodiment of this application. That a paging occasion at each moment has transmission opportunities on three subbands in frequency domain is used as an example. First, according to determining rules of a time domain PF and PO, all UEs are divided into four groups in time domain, where UE 0 represents a first group of UEs, UE 1 represents a second group of UEs, UE 2 represents a third group of UEs, and UE 3 represents a fourth group of UEs. For the first group of UEs, a position that is of a time domain PO and that is determined according to the foregoing formula is a PO 0. However, the PO 0 cannot be actually used for transmission due to impact of an LBT failure. Therefore, the PO 0 is transferred to a subband 1 of the $3^{rd}$ PO that is in a time window using the PO 0 as a start point and three POs as a length. The $3^{rd}$ PO moment is a PO moment used for the third group of UEs, and LBT performed by a base station on the $3^{rd}$ PO moment succeeds in both the subband 1 and a subband 2. In this case, a PO opportunity in the subband 2 is by default allocated to the third group of UEs. Therefore, a remaining PO opportunity in the subband 1 may be transferred to the first group to UEs.

It can be learned from the descriptions of the examples that the network device may determine the first paging occasion that is in the discontinuous reception periodicity and that is used to send the first paging message. If the network device cannot actually send the paging message on the first paging occasion, the network device may transfer the first paging occasion that cannot be actually used because the channel listening fails to a next paging occasion in the time window, and the UE may receive the first paging message on another paging occasion in the time window based on the first paging occasion. Therefore, transmission efficiency of the paging message is improved. In addition, in this embodiment of this application, the UE needs to wake up only at some predefined moments in a DRX periodicity, but sleeps at another moment in the DRX periodicity. In this embodiment of this application, the UE attempts to receive the paging message on more paging occasions in the time window, so that receiving efficiency of the paging message is improved. Therefore, the UE needs to wake up only inside the time window to receive the paging message, and does not need to frequently wake up outside the time window, so that power consumption of the UE can be reduced and power is saved. In this embodiment of this application, the UE attempts to receive the paging message on a paging occasion in the time window, so that receiving efficiency of the paging message is improved and detection complexity of the UE may be reduced.

In the conventional technology, the UE determines only one of a plurality of POs in a DRX periodicity to receive a paging message. However, in this embodiment of this application, a time point PO used to receive a paging message is first determined in a DRX periodicity according to a predefined rule. If the base station cannot actually send the paging message at this time point because LBT fails, the base station is allowed to transfer the PO on which the LBT fails to a next PO time point in a time window for transmission. Correspondingly, the UE uses the predefined paging time point PO as a start point, and continues to search for and detect the paging message on another available PO occasion resource in the time window. The available PO occasion resource in the time window includes a time domain resource on which LBT succeeds and/or a frequency domain resource on which LBT succeeds. The base station indicates, by using a reference signal sequence, a paging position of the transferred paging message after the LBT fails.

Figure 6:
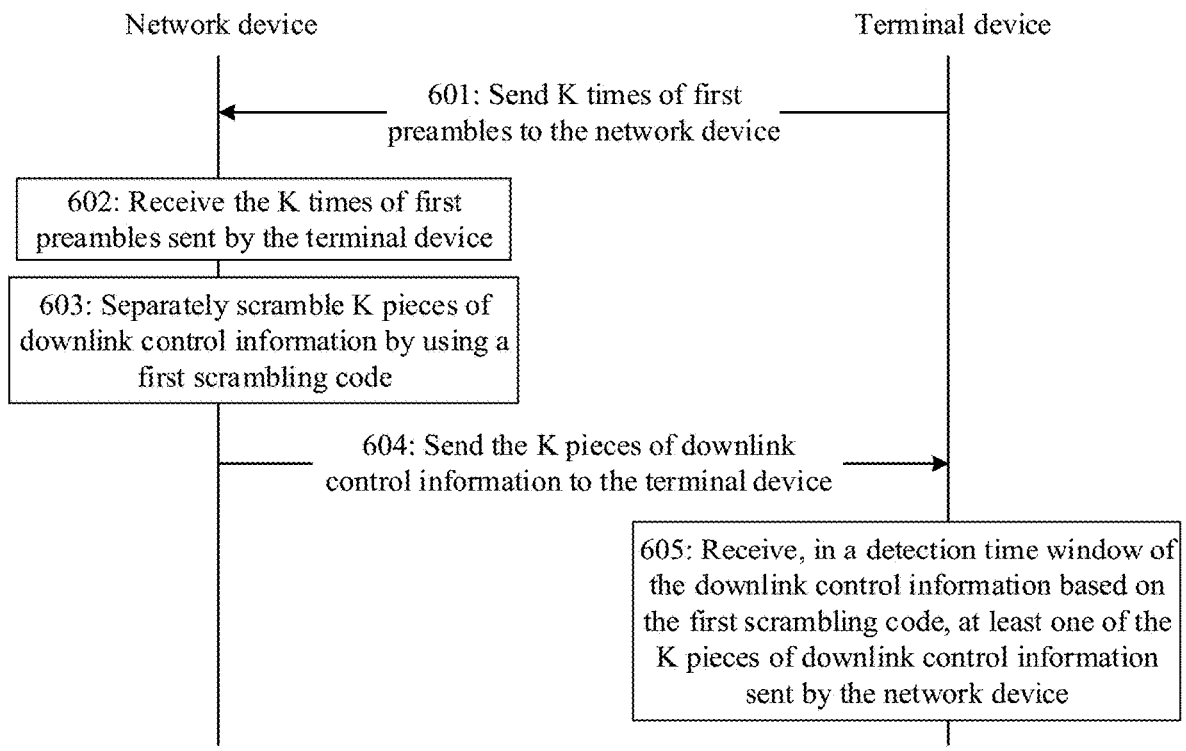
FIG. 6 is a schematic flowchart of interaction between a network device and a terminal device according to an embodiment of this application.

The foregoing embodiment describes one paging method provided in the embodiments of this application. In another aspect, for a random access process of UE, in a conventional technology, a network device determines, based on a time-frequency resource that is of a random access channel and that is configured for the UE, a radio network temporary identifier (RNTI) of a downlink control channel corresponding to a random access response. For time-frequency resources of different random access channels, RNTIs of corresponding downlink control channels are also different, and the UE needs to perform a plurality of detection attempts on a plurality of downlink control channels scrambled by using different RNTIs. Therefore, detection complexity of the UE is increased in the conventional technology. In this embodiment of this application, after same UE sends a same random access preamble based on different random access resources, a network device performs random access response on the random access preamble sent by the UE. Control channels that are of random access responses and that are corresponding to the random access resources separately of a plurality of transmissions are associated with a same RNTI. Therefore, the UE needs to perform only one detection attempt on a plurality of downlink control channels scrambled by using the same RNTI, so that detection complexity of the UE is greatly reduced. Next, FIG. 6 is a schematic flowchart of interaction between a network device and a terminal device according to this embodiment of this application. A random access method provided in this embodiment of this application mainly includes the following steps.

601: The terminal device sends K times of first preambles to the network device, where the first preamble is any preamble that needs to be sent by the terminal device to the network device, the K times of first preambles correspond to K pieces of downlink control information, the K pieces of downlink control information are scrambled by using a first scrambling code, and K is a positive integer greater than 1.

In this embodiment of this application, the terminal device may send a same preamble to the network device for a plurality of times. For example, a quantity of sending times is represented by K, and the same sent preamble is represented as the first preamble, where the first preamble is any preamble that needs to be sent by the terminal device to the network device. For the K times of first preambles of the terminal device, the network device needs to correspondingly send the K pieces of downlink control information for the K times of first preambles. The K pieces of downlink control information are scrambled by using a same scrambling code, and the same used scrambling code is represented as the first scrambling code.

602: The network device receives the K times of first preambles sent by the terminal device, where the first preamble is any preamble that needs to be sent by the terminal device to the network device, and K is a positive integer greater than 1.

In this embodiment of this application, for the K times of first preambles sent by the terminal device, after receiving the first preambles, the network device correspondingly sends the K pieces of downlink control information.

603: The network device scrambles the K pieces of downlink control information by using the first scrambling code.

In this embodiment of this application, for the K times of first preambles sent by the terminal device, after receiving the K times of sent first preambles, the network device needs to send the K pieces of downlink control information. The K pieces of downlink control information are scrambled by using a same scrambling code, and the same used scrambling code is represented as the first scrambling code. The terminal device needs to perform only one detection attempt on a plurality of downlink control channels scrambled by using a same RNTI, so that detection complexity of the terminal device can be greatly reduced.

604: The network device sends the K pieces of downlink control information to the terminal device.

In some embodiments of this application, the K times of first preambles correspond to K random access resources, and the first scrambling code is determined based on a first random access resource in the K random access resources.

The network device sends the K pieces of downlink control information for the K times of first preambles. The K pieces of downlink control information are scrambled by using a same scrambling code, and the same used scrambling code is represented as the first scrambling code. For example, the first scrambling code is determined based on the first random access resource in the K random access resources. In other words, the terminal device may determine, based on only the first random access resource, the first scrambling code used to scramble the K pieces of downlink control information, and there is no need to separately calculate scrambling codes of the K pieces of downlink control information for the K random access resources corresponding to the K times of first preambles. In addition, the terminal device needs to perform only one detection attempt on a plurality of downlink control channels scrambled by using a same RNTI, so that detection complexity of the terminal device can be greatly reduced.

Further, in some embodiments of this application, the first random access resource is a predefined random access resource; or the first random access resource is configured by the network device for the terminal device.

A network device side and a terminal device side may predefine the first random access resource, for example, predetermine that the first random access resource is a determined random access resource in the K random access resources. For example, the first random access resource is the $1^{st}$ random access resource in the K random access resources or the last random access resource in the K random access resources. This is not specifically limited herein. The terminal device may determine the first random access resource in the predefined manner or according to the predefined rule. Alternatively, after determining the first random access resource, the network device may further send indication information of the first random access resource to the terminal device, so that the terminal device determines the first random access resource in the K random access resources based on the indication information.

Further, in some embodiments of this application, the K times of first preambles correspond to K random access resources, where the K random access resources belong to a first random access resource group, and the first random access resource group is predefined, or the first random access resource group is configured by the network device for the terminal device.

The network device may predefine the first random access resource group. For example, information about a random access resource included in the first random access resource group is determined according to a predefined rule. The predefined rule is optionally as follows: K consecutive random access resources in time domain and/or frequency domain form the first random access resource group, and so on. This is not specifically limited herein. In this case, the terminal device may determine the first random access resource group in a predefined manner. Alternatively, after determining the first random access resource group, the network device may further send indication information of the first random access resource group to the terminal device, so that the terminal device determines the first random access resource group based on the indication information. Optionally, the network device may directly indicate the information about the random access resource included in the first random access resource group, for example, an index of the random access resource. Optionally, the network device may alternatively indicate, to the terminal device, information such as an interval between any two consecutive random access resources included in the first random access resource group and/or a quantity of random access resources included in the first random access resource group. This is not specifically limited herein.

605: The terminal device receives, in a detection time window of the downlink control information based on the first scrambling code, at least one of the K pieces of downlink control information sent by the network device.

In this embodiment of this application, the network device sends the K pieces of downlink control information, and the downlink control information may include scheduling information of a random access response message. Because the network device performs scrambling by using the same first scrambling code, the terminal device needs to receive, in the detection time window, only at least one of the K pieces of downlink control information by using the same first scrambling code. For the terminal device, there is no need to perform a plurality of detection attempts on a plurality of downlink control channels scrambled by using different RNTIs. Therefore, detection complexity of the terminal device can be greatly reduced.

To better understand and implement the foregoing solutions in this embodiment of this application, the following uses a corresponding application scenario as an example for specific description.

Contention-based random access refers to a random access process that is completely randomly initiated by UE and in which an evolved base station does not allocate a dedicated resource to the UE. A contention-based random access process is completed in four steps. A terminal sends a preamble (that is, a Msg1) to a base station; the base station sends a random access response (RAR) (that is, a Msg2) to the terminal based on the received preamble; then the terminal and the base station perform the $1^{st}$ time of uplink scheduling transmission (that is, a Msg3); and finally, the base station feeds back a contention resolution (that is, a Msg4) to the terminal. Specifically, a process in which the base station sends the RAR to the terminal is as follows: The base station determines a RA-RNTI based on a PRACH time-frequency resource position for sending the preamble, scrambles the RAR by using the random access radio network temporary identifier (RA-RNTI), and then sends, to the terminal, the scrambled RAR and control information for scheduling the RAR. Correspondingly, the terminal determines the RA-RNTI based on information about a time-frequency resource of a random access channel (RACH) on which the terminal sends the preamble, and then performs demodulation based on the RA-RNTI and receives the RAR. It can be learned that the terminal needs to obtain a same RA-RNTI as that at the base station, to obtain the correct RAR. Currently, the terminal and the base station mainly determine the RA-RNTI based on at least one of a time index and/or a frequency domain position index that are/is used to represent the time-frequency resource of the RACH, for example, a slot index, an OFDM symbol index, a subframe index, a system frame number index, and a frequency domain position index. For ease of description, random access resources are collectively referred to as RACH resources below.

In an unlicensed frequency band, to resolve a problem that a quantity of RACH sending opportunities is reduced because LBT fails, before the base station sends the random access response, the terminal device may perform a plurality of RACH transmission attempts for a same random access preamble. Because a plurality of RACH transmissions correspond to a same random access preamble, the base station responds, for a RACH resource of each transmission, with downlink control information scrambled by using a same RNTI value. Correspondingly, the UE attempts to detect, in a detection time window, only at least one piece of downlink control information in a plurality of pieces of downlink control information scrambled by using the same RNTI value. Herein, RNTI scrambling may mean that scrambling is performed on a CRC of the downlink control information, or scrambling is directly performed on DCI. This is not specifically limited herein.

In some embodiments of this application, a plurality of pieces of downlink control information of random access responses correspond to a same RNTI value, and a plurality of corresponding RACH resources may form a RACH resource group, where random access responses of RACH resources that are in a same group correspond to a same RNTI value. The same RNTI value may be obtained based on a reference RACH resource in the RACH resource group. For example, the reference RACH resource may be the $1^{st}$ RACH resource or the last RACH resource in the RACH resource group. This is not specifically limited herein.

In some embodiments of this application, a reference RACH resource in a RACH resource group may be predefined, or may be configured by the base station for the UE. For example, the reference RACH resource is notified to the UE by using remaining minimum system information (RMSI). A configuration manner of a reference signal resource may alternatively be: using other information or signaling other than the RMSI. For example, other system information (OSI) or radio resource control (RRC) signaling may be used. This is not specifically limited herein. The RACH resource group herein may be the same as or different from a RACH resource group in mapping from a synchronization signal or broadcast channel block (SS/BCH Block) to a group of random access occasions (RO). For example, the RACH resource group herein may include all or some RACH resources in the RACH resource group to which the SS/BCH block is mapped.

In some embodiments of this application, the base station and the UE may determine, according to the following formula, an RNTI value associated with downlink control information corresponding to a RACH resource:

$$RA\text{-}RNTI = 1 + s\_id + 14 \times t\_id + 14 \times 80 \times f\_id + 14 \times 80 \times 8 \times ul\_carrier\_id.$$

s_id is an index of the $1^{st}$ orthogonal frequency division multiplexing (OFDM) symbol corresponding to the RACH resource (0≤s_id<14), t_id is an index of the $1^{st}$ slot corresponding to the RACH resource in a system frame (0≤t_id<80), f_id is an index of the RACH resource in frequency domain (0≤f_id<8), and ul_carrier_id is an index of an uplink carrier used for transmission of the RACH resource, where 0 represents an NR normal uplink carrier, and 1 represents an NR supplementary uplink carrier.

In the foregoing embodiment of this application, the RACH resources of a plurality of transmissions before the random access response are associated with a same RNTI value, and the plurality of RACH resources correspond to a same random access preamble. Therefore, the UE may determine, based on only one of the random access resources of the plurality of transmissions, a same scrambling code used to scramble the plurality of pieces of downlink control information, so that detection complexity of the UE is reduced.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to preferred embodiments, and the involved actions and modules are not necessarily required by this application.

To better implement the foregoing solutions in the embodiments of this application, the following further provides a related apparatus for implementing the foregoing solutions.

Figure 7:
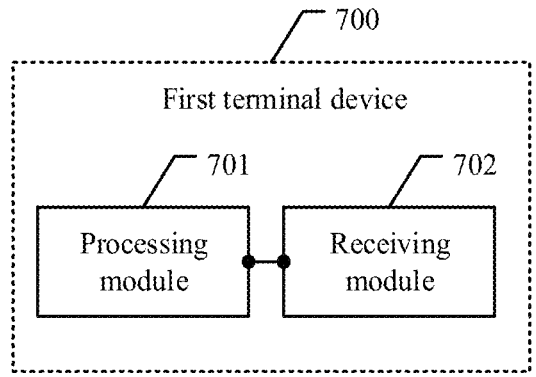
FIG. 7 is a schematic structural diagram of a first terminal device according to an embodiment of this application.

FIG. 7 is a schematic structural diagram of a terminal device according to an embodiment of this application. The terminal device is specifically a first terminal device 700, and the first terminal device 700 includes a processing module 701 and a receiving module 702.

The processing module 701 is configured to determine, in a discontinuous reception periodicity, a first paging occasion of the first terminal device.

The processing module 701 is further configured to: when channel listening on the first paging occasion fails, receive, through the receiving module 702, a first paging message in a time window, where a start position of the time window is determined based on the first paging occasion, and the time window includes at least one paging occasion.

In some embodiments of this application, each paging occasion included in the time window corresponds to at least one paging position, and different paging positions occupy different bandwidth areas.

In some embodiments of this application, the processing module 701 is further configured to receive, through the receiving module 702, the first paging message on a second paging occasion in the time window.

In some embodiments of this application, the second paging occasion corresponds to at least two paging positions, and the processing module 701 is further configured to receive, through the receiving module 702, the first paging message at a first paging position corresponding to the second paging occasion, where a second paging position corresponding to the second paging occasion is used by a second terminal device to receive a second paging message.

In some embodiments of this application, the second paging position is a predefined paging position.

In some embodiments of this application, the second paging position is a paging position corresponding to a bandwidth area with a smallest index or a paging position corresponding to a bandwidth area with a largest index.

In some embodiments of this application, the processing module 701 is further configured to receive, through the receiving module 702, a first reference signal sequence before receiving, through the receiving module, the first paging message at the first paging position corresponding to the second paging occasion, where the first reference signal sequence carries indication information, and the indication information is used to indicate the first paging position at which the first paging message is located.

In some embodiments of this application, the indication information is further used to indicate that the first paging message corresponds to the first paging occasion in the time window.

In some embodiments of this application, the first reference signal sequence is further used to indicate start position information of signal sending.

In some embodiments of this application, a quantity of paging occasions included in the time window is predefined, or a quantity of paging occasions is sent by a network device to the first terminal device.

In some embodiments of this application, the processing module 701 is further configured to determine, in the discontinuous reception periodicity based on an identifier of the first terminal device, the first paging occasion of the first terminal device.

Figure 8:
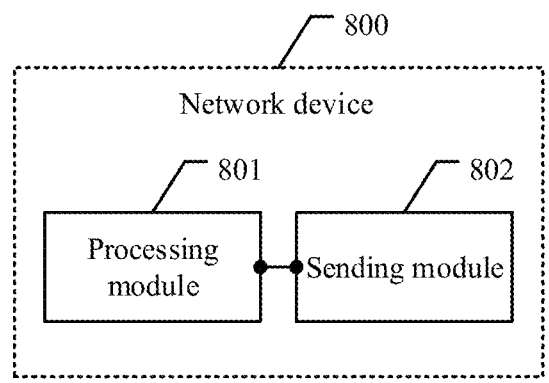
FIG. 8 is a schematic structural diagram of a network device according to an embodiment of this application.

FIG. 8 is a schematic structural diagram of a network device according to an embodiment of this application. The network device 800 provided in this embodiment of this application includes a processing module 801 and a sending module 802.

The processing module 801 is configured to determine a first paging occasion of a first terminal device.

The processing module 801 is further configured to send, through the sending module 802, a first paging message in a time window, where a start position of the time window is determined based on the first paging occasion, and the time window includes at least one paging occasion.

In some embodiments of this application, each paging occasion included in the time window corresponds to at least one paging position, and different paging positions occupy different bandwidth areas.

In some embodiments of this application, the time window further includes a second paging occasion, and the processing module 801 is further configured to: send, through the sending module 802, the first paging message to the first terminal device on the second paging occasion; and send, through the sending module, a second paging message to a second terminal device on the second paging occasion.

In some embodiments of this application, the second paging occasion corresponds to at least two paging positions, and the processing module 801 is further configured to: send, through the sending module 802, the first paging message to the first terminal device at a first paging position corresponding to the second paging occasion; and send, through the sending module, the second paging message to the second terminal device at a second paging position corresponding to the second paging occasion.

In some embodiments of this application, the second paging position is a paging position corresponding to a bandwidth area with a smallest index or a paging position corresponding to a bandwidth area with a largest index.

In some embodiments of this application, the processing module 801 is further configured to send, through the sending module 802, a first reference signal sequence to the first terminal device before sending the first paging message in the time window, where the first reference signal sequence carries indication information, and the indication information is used to indicate the first paging position at which the first paging message is located.

In some embodiments of this application, the indication information is further used to indicate that the first paging message corresponds to the first paging occasion in the time window.

In some embodiments of this application, the first reference signal sequence is used to indicate start position information of signal sending.

In some embodiments of this application, a quantity of paging occasions included in the time window is predefined, or a quantity of paging occasions is sent by the sending module to the first terminal device.

Figure 9:
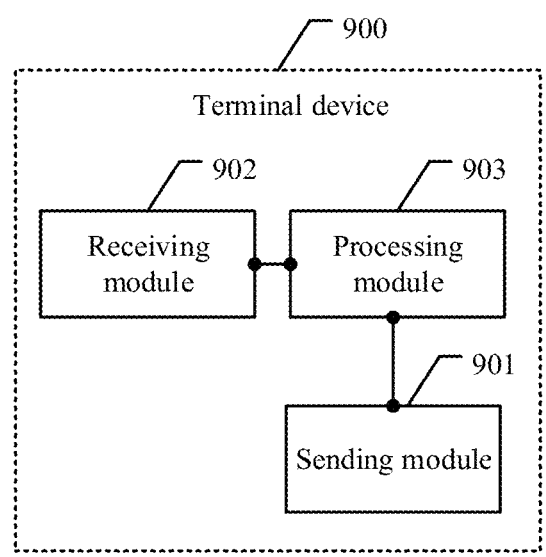
FIG. 9 is a schematic structural diagram of a terminal device according to an embodiment of this application.

FIG. 9 is a schematic structural diagram of a terminal device according to an embodiment of this application. The terminal device 900 provided in this embodiment of this application includes a sending module 901, a receiving module 902, and a processing module 903.

The processing module 903 is configured to send, through the sending module 901, K times of first preambles to a network device, where the first preamble is any preamble that needs to be sent by the terminal device to the network device, the K times of first preambles correspond to K pieces of downlink control information, the K pieces of downlink control information are scrambled by using a first scrambling code, and K is a positive integer greater than 1.

The processing module 903 is further configured to receive, through the receiving module 902 in a detection time window of the downlink control information based on the first scrambling code, at least one of the K pieces of downlink control information sent by the network device.

In some embodiments of this application, the K times of first preambles correspond to K random access resources, and the first scrambling code is determined based on a first random access resource in the K random access resources.

In some embodiments of this application, the first random access resource is a predefined random access resource; or the first random access resource is configured by the network device for the terminal device.

In some embodiments of this application, the K times of first preambles correspond to K random access resources, where the K random access resources belong to a first random access resource group, and the first random access resource group is predefined, or the first random access resource group is configured by the network device for the terminal device.

Figure 10:
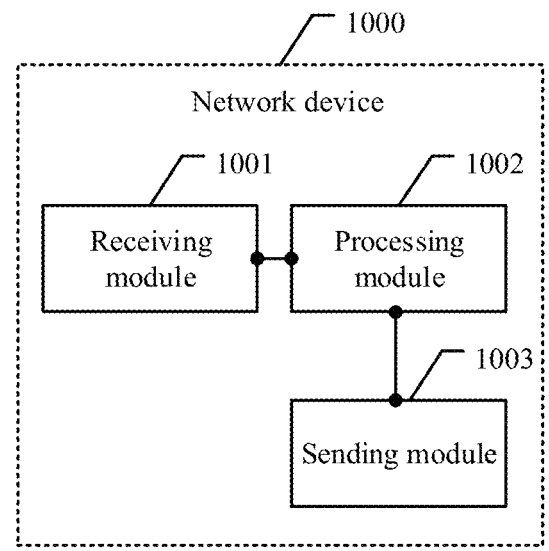
FIG. 10 is a schematic structural diagram of another network device according to an embodiment of this application.

FIG. 10 is a schematic structural diagram of a terminal device according to an embodiment of this application. The network device 1000 provided in this embodiment of this application includes a receiving module 1001, a processing module 1002, and a sending module 1003.

The processing module 1002 is configured to receive, through the receiving module 1001, K times of first preambles sent by a terminal device, where the first preamble is any preamble that needs to be sent by the terminal device to the network device, and K is a positive integer greater than 1.

The processing module 1002 is configured to scramble K pieces of downlink control information by using a first scrambling code.

The processing module 1002 is configured to send, through the sending module 1003, the K pieces of downlink control information to the terminal device in a time window.

In some embodiments of this application, the K times of first preambles correspond to K random access resources, and the first scrambling code is determined based on a first random access resource in the K random access resources.

In some embodiments of this application, the first random access resource is a predefined random access resource; or the first random access resource is configured by the network device for the terminal device.

In some embodiments of this application, the K times of first preambles correspond to K random access resources, where the K random access resources belong to a first random access resource group, and the first random access resource group is predefined, or the first random access resource group is configured by the network device for the terminal device.

It should be noted that content such as information exchange between the modules/units of the apparatus and the execution processes thereof is based on the same idea as the method embodiments of this application, and produces the same technical effects as the method embodiments of this application. For the specific content, refer to the foregoing descriptions in the method embodiments of this application. Details are not described herein again.

An embodiment of this application further provides a computer storage medium. The computer storage medium stores a program. The program is executed to perform some or all of the steps described in the method embodiments.

Figure 11:
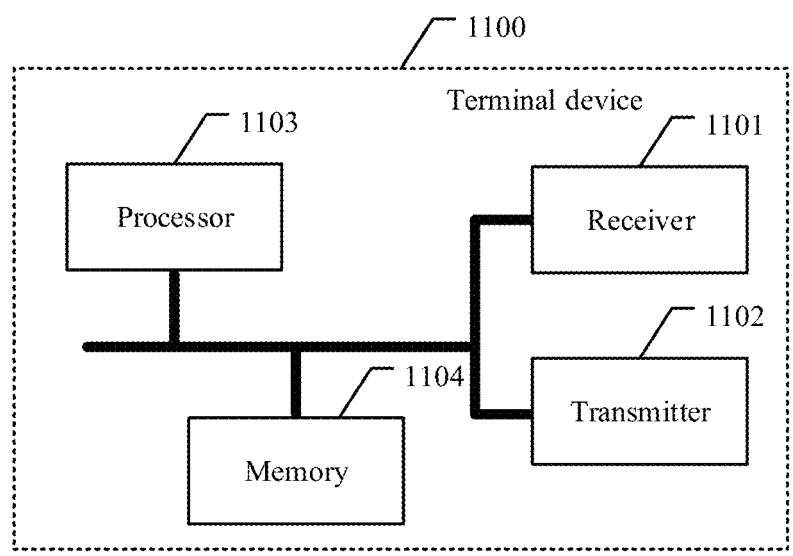
FIG. 11 is a schematic structural diagram of another terminal device according to an embodiment of this application.

The following describes another terminal device provided in an embodiment of this application. Referring to FIG. 11, the terminal device 1100 includes:

a receiver 1101, a transmitter 1102, a processor 1103, and a memory 1104 (there may be one or more processors 1103 in the terminal device 1100, and one processor is used as an example in FIG. 11). In some embodiments of this application, the receiver 1101, the transmitter 1102, the processor 1103, and the memory 1104 may be connected by using a bus or in another manner. In FIG. 11, a bus connection is used as an example.

The memory 1104 may include a read-only memory and a random access memory, and provide an instruction and data for the processor 1103. A part of the memory 1104 may further include a non-volatile random access memory (NVRAM). The memory 1104 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1103 controls an operation of the terminal device, and the processor 1103 may also be referred to as a central processing unit (CPU). During specific application, the components of the terminal device are coupled together by using a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1103 or implemented by the processor 1103. The processor 1103 may be an integrated circuit chip and has a signal processing capability. In an implementation process, the steps in the foregoing methods may be completed by using a hardware integrated logic circuit in the processor 1103 or instructions in a form of software. The foregoing processor 1103 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1103 may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and completed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor 1103.

The receiver 1101 may be configured to: receive input digit or character information, and generate signal input related to a related setting and function control of the terminal device. The transmitter 1102 may include a display device such as a display screen. The transmitter 1102 may be configured to output the digit or character information through an external interface.

In this embodiment of this application, the processor 1103 is configured to perform the paging method performed by the terminal device or the first terminal device.

Figure 12:
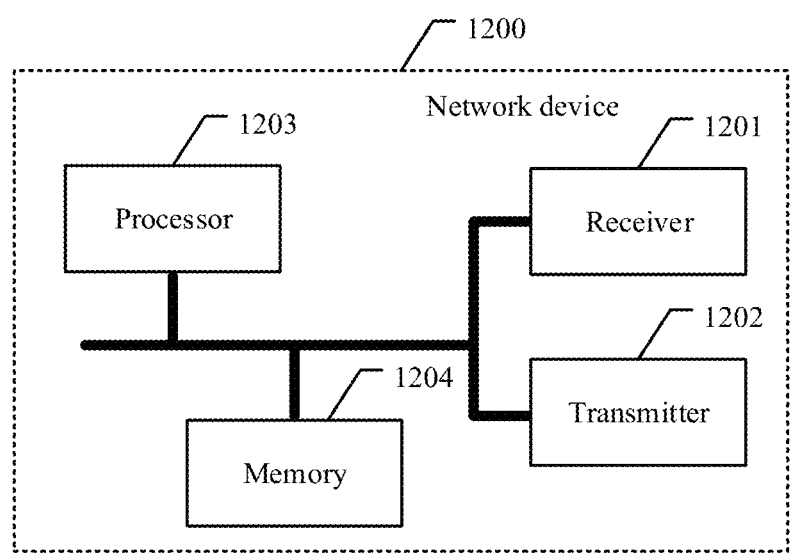
FIG. 12 is a schematic structural diagram of another network device according to an embodiment of this application.

The following describes another network device provided in an embodiment of this application. Referring to FIG. 12, the network device 1200 includes:

a receiver 1201, a transmitter 1202, a processor 1203, and a memory 1204 (there may be one or more processors 1203 in the network device 1200, and one processor is used as an example in FIG. 12). In some embodiments of this application, the receiver 1201, the transmitter 1202, the processor 1203, and the memory 1204 may be connected by using a bus or in another manner. In FIG. 12, a bus connection is used as an example.

The memory 1204 may include a read-only memory and a random access memory, and provide an instruction and data for the processor 1203. A part of the memory 1204 may further include an NVRAM. The memory 1204 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1203 controls an operation of the network device, and the processor 1203 may also be referred to as a CPU. During specific application, the components of the network device are coupled together by using a bus system. In addition to a data bus, the bus system may further include a power bus, a control bus, a status signal bus, and the like. However, for clear description, various types of buses in the figure are marked as the bus system.

The methods disclosed in the embodiments of this application may be applied to the processor 1203 or implemented by the processor 1203. The processor 1203 may be an integrated circuit chip and has a signal processing capability. In an implementation process, the steps in the foregoing methods may be completed by using a hardware integrated logic circuit in the processor 1203 or instructions in a form of software. The processor 1203 may be a general-purpose processor, a DSP, an ASIC, an FPGA or another programmable logic device, a discrete gate or a transistor logic device, or a discrete hardware component. The processor 1203 may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and completed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and completes the steps in the foregoing methods in combination with hardware of the processor 1203.

In this embodiment of this application, the processor 1203 is configured to perform the paging method performed by the network device.

In another possible design, the chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip in the terminal is enabled to perform the wireless communication method according to any one of the possible implementations of the first aspect. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

The processor mentioned anywhere above may be a general-purpose central processing unit, a microprocessor, an ASIC, or one or more integrated circuits for controlling program execution of the method in the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A paging method, comprising:
determining, by a first terminal device in a discontinuous reception periodicity, a first paging occasion of the first terminal device; and
when channel listening of a listen before talk (LBT) operation on the first paging occasion fails, receiving, by the first terminal device, a first paging message in a time window, wherein a start position of the time window is determined based on the first paging occasion, and the time window comprises at least one paging occasion.

2. The method according to claim 1, wherein each paging occasion comprised in the time window corresponds to at least one paging position, and different paging positions occupy different bandwidth areas.

3. The method according to claim 1, wherein the receiving, by the first terminal device, a first paging message in a time window comprises:
in response to the time window comprising a second paging occasion, receiving, by the first terminal device, the first paging message on the second paging occasion.

4. The method according to claim 3, wherein the receiving, by the first terminal device, the first paging message on the second paging occasion comprises:
in response to the second paging occasion corresponding to at least two paging positions, receiving, by the first terminal device, the first paging message at a first paging position corresponding to the second paging occasion, and a second paging position corresponding to the second paging occasion is used by a second terminal device to receive a second paging message.

5. The method according to claim 4, wherein the second paging position is a paging position corresponding to a bandwidth area with a smallest index or a paging position corresponding to a bandwidth area with a largest index.

6. The method according to claim 4, wherein before the receiving, by the first terminal device, the first paging message at a first paging position corresponding to the second paging occasion, the method further comprises:
receiving, by the first terminal device, a first reference signal sequence, wherein the first reference signal sequence carries indication information, and the indication information is used to indicate the first paging position at which the first paging message is located.

7. The method according to claim 6, wherein the indication information is further used to indicate that the first paging message corresponds to the first paging occasion in the time window.

8. A paging method, comprising:
determining, by a network device, a first paging occasion of a first terminal device;
performing listen before talk (LBT) on the first paging occasion; and
when channel listening of the LBT performed by the network device on the first paging occasion fails, sending, by the network device, a first paging message in a time window, wherein a start position of the time window is determined based on the first paging occasion, and the time window comprises at least one paging occasion.

9. The method according to claim 8, wherein each paging occasion comprised in the time window corresponds to at least one paging position, and different paging positions occupy different bandwidth areas.

10. The method according to claim 8, wherein the sending, by the network device, a first paging message in a time window comprises:
in response to the time window comprising a second paging occasion, sending, by the network device, the first paging message to the first terminal device on the second paging occasion; and
sending, by the network device, a second paging message to a second terminal device on the second paging occasion.

11. The method according to claim 10, wherein the sending, by the network device, the first paging message to the first terminal device on the second paging occasion and the sending, by the network device, a second paging message to a second terminal device on the second paging occasion comprise:
in response to the second paging occasion corresponding to at least two paging positions, sending, by the network device, the first paging message to the first terminal device at a first paging position corresponding to the second paging occasion; and
sending, by the network device, the second paging message to the second terminal device at a second paging position corresponding to the second paging occasion.

12. The method according to claim 11, wherein the second paging position corresponding to the second paging occasion is a paging position corresponding to a bandwidth area with a smallest index or a paging position corresponding to a bandwidth area with a largest index.

13. The method according to claim 11, wherein before the sending, by the network device, a first paging message in a time window, the method further comprises:
sending, by the network device, a first reference signal sequence to the first terminal device, wherein the first reference signal sequence carries indication information, and the indication information is used to indicate the first paging position at which the first paging message is located.

14. The method according to claim 13, wherein the indication information is further used to indicate that the first paging message corresponds to the first paging occasion in the time window.

15. A terminal device, wherein the terminal device comprises at least one processor, one or more memory coupled to the at least one processor, and storing programming instructions for execution by the at least one processor to cause the terminal device to:
determine, in a discontinuous reception periodicity, a first paging occasion of the terminal device; and
when channel listening of a listen before talk (LBT) operation on the first paging occasion fails, receive a first paging message in a time window, wherein a start position of the time window is determined based on the first paging occasion, and the time window comprises at least one paging occasion.

16. The terminal device according to claim 15, wherein each paging occasion comprised in the time window corresponds to at least one paging position, and different paging positions occupy different bandwidth areas.

17. The terminal device according to claim 15, wherein the time window further comprises a second paging occasion, and the programming instructions, when executed by the at least one processor, cause the terminal device to:
receive the first paging message on the second paging occasion.

18. The terminal device according to claim 17, wherein the second paging occasion corresponds to at least two paging positions, and the programming instructions, when executed by the at least one processor, cause the terminal device to:
receive the first paging message at a first paging position corresponding to the second paging occasion, wherein a second paging position corresponding to the second paging occasion is used by a second terminal device to receive a second paging message.

19. The terminal device according to claim 18, wherein the second paging position is a paging position corresponding to a bandwidth area with a smallest index or a paging position corresponding to a bandwidth area with a largest index.

20. The terminal device according to claim 18, the programming instructions, when executed by the at least one processor, cause the terminal device to:
receive a first reference signal sequence before receiving the first paging message at the first paging position corresponding to the second paging occasion, wherein the first reference signal sequence carries indication information, and the indication information is used to indicate the first paging position at which the first paging message is located.

* * * * *